United States Patent
Baxter

(10) Patent No.: US 6,202,106 B1
(45) Date of Patent: Mar. 13, 2001

(54) METHOD FOR PROVIDING SPECIFIC KNOWLEDGE OF A STRUCTURE OF PARAMETER BLOCKS TO AN INTELLIGENT DIRECT MEMORY ACCESS CONTROLLER

(75) Inventor: Glenn A. Baxter, Scotts Valley, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/150,509

(22) Filed: Sep. 9, 1998

(51) Int. Cl.[7] .................................................. G06F 13/00
(52) U.S. Cl. .................... 710/22; 710/3; 710/22; 710/26; 711/219
(58) Field of Search ................... 710/20, 22, 23, 710/26, 27, 28, 130, 3, 4, 6, 62, 9; 711/170, 211, 219

(56) References Cited

U.S. PATENT DOCUMENTS

| | | | |
|---|---|---|---|
| 4,901,232 | * | 2/1990 | Harrington et al. ............... 710/6 |
| 5,131,081 | * | 7/1992 | MacKenna et al. .............. 710/22 |
| 5,313,607 | * | 5/1994 | Tokumaru ....................... 710/22 |
| 5,416,916 | * | 5/1995 | Bayle ............................ 710/130 |
| 5,430,853 | * | 7/1995 | Arakawa ........................ 710/22 |
| 5,459,860 | * | 10/1995 | Burnett et al. ................. 707/101 |
| 5,497,501 | * | 3/1996 | Kohzono et al. ............... 710/29 |
| 5,655,151 | * | 8/1997 | Bowes et al. .................. 710/22 |
| 5,659,798 | * | 8/1997 | Blumrich et al. .............. 710/26 |
| 5,890,012 | * | 3/1999 | Poisner .......................... 710/22 |
| 6,003,122 | * | 12/1999 | Yarch et al. .................... 711/201 |
| 6,088,777 | * | 7/2000 | Sorber ........................... 711/171 |

FOREIGN PATENT DOCUMENTS

401050154 * 2/1989 (JP) ............................... G06F/13/28

OTHER PUBLICATIONS

William Ford, William Topp: "Assembly Language and Systems Programming for the M68000 Family": published by D. C. Heath and Company; Second Edition; Copyright 1992; pp. 126–128.

* cited by examiner

*Primary Examiner*—Thomas C. Lee
*Assistant Examiner*—Chun Cao
(74) *Attorney, Agent, or Firm*—Bever, Hoffman & Harms, LLP; Jeanette S. Harms; Lois D. Cartier

(57) ABSTRACT

The Intelligent DMA Controller (IDMAC) significantly reduces system latency by replacing one or more layers of software with hardware. The IDMAC uses controlwise and datawise intelligence. The controlwise intelligence of the IDMAC is given specific knowledge of the structure of certain pieces of memory or hardware registers, (e.g. parameter blocks), used for Inter Process Communication. This specific knowledge can be imparted during the design phase of the IDMAC, or dynamically provided during its operation as system requirements dictate. The IDMAC achieves its DMA controlwise intelligence by understanding parameter blocks (PBs). The IDMAC reads the structure of the PB from memory directly, gets all of its PB parameters directly from memory, dereferencing as required, and then begins transferring data between the source and destination as instructed by the PB(s). Examples of PB parameters are source address, destination address, transfer length, and data intelligence opcode. The IDMAC allows for bidirectional nesting of PBs, thereby allowing for complete error recovery. Additionally, the IDMAC provides datawise intelligence to effect manipulations on the data that is undergoing a DMA transfer.

16 Claims, 11 Drawing Sheets

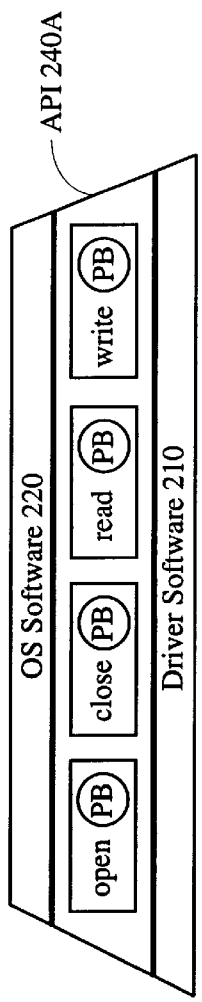
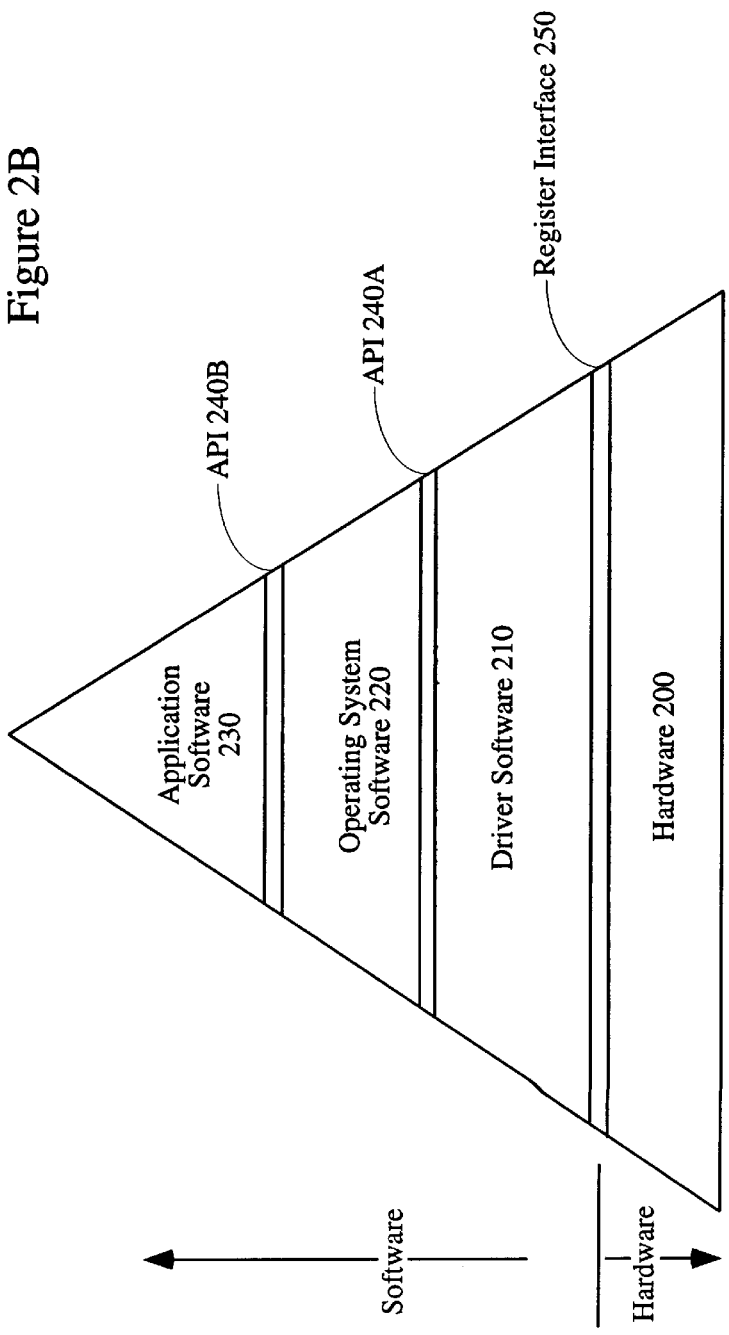
Figure 2B
Figure 2A

IDMAC Simple Register Model

Example Bus Cycles; Simplified IDMAC

Chained Parameter Blocks in Memory

METHOD FOR PROVIDING SPECIFIC KNOWLEDGE OF A STRUCTURE OF PARAMETER BLOCKS TO AN INTELLIGENT DIRECT MEMORY ACCESS CONTROLLER

FIELD OF THE INVENTION

The present invention relates generally to a direct memory access controller (DMAC) and more particularly to an intelligent DMAC.

BACKGROUND OF THE INVENTION

Direct Memory Access (DMA) is a method for direct movement of data between two components, for example in a computer system. Specifically, the data is moved between the components via a bus without program intervention. A DMA Controller (DMAC) is typically a memory-mapped peripheral device that performs memory-to-memory, memory-to-peripheral, peripheral-to-memory, and peripheral-to-peripheral data transfers. The specialized hardware of the DMAC maximizes utilization of the system bus so that transfers are performed quickly and efficiently. In this manner, DMA operations typically outperform data movement operations performed by a CPU. Additionally, DMA operations free up the CPU to do other operations.

FIG. 1 illustrates a typical prior art DMAC 100 instantiated into a conventional computing system including a CPU 110, a memory 120, and a peripheral device 130. CPU 110 executes the software instructions of the computing system, whereas memory 120 stores data and instructions for the computing system. Peripheral device 130 generally expresses output signals of or provides input signals to the computing system. Examples of peripheral device 130 include graphics cards, keyboard interfaces, and disk I/Os. The computing system further includes at least one bus 140 which facilitates communication between the various elements. For example, CPU 110 utilizes bus 140 to communicate data to or from peripheral device 130. Most prior art DMACs rely on bus 140 to conduct the DMA operation.

DMAC 100 typically includes a set of registers which hold information necessary to the DMA operation. For example, DMAC 100 includes a source register (Src) 101 for storing the contents of the source address of the DMA bus cycles, a destination register (Dest) 102 for storing the contents of the destination address of the DMA bus cycles, and a length register (Len) 103 for storing the number of pieces of data to transfer. In this embodiment, DMAC 100 also includes a next register (Next) 104 for storing the address of the next place in memory where the DMACs parameters are stored (explained in detail below). Note that herein the term "registers" may include counters, registers, or a combination therein.

A single channel DMAC contains one set of registers 101–104. Many prior art DMACs support multiple channels which are represented in FIG. 1 as the dashed line boxes under DMAC 100. In a typical multiple channel DMAC, registers 101–104 are simply instantiated once per channel. Thus, a four channel DMAC would include four sets of registers 101–104.

FIG. 2A is a typical example of the hierarchy of software and hardware in a conventional computing system. At the bottom of the hierarchy is hardware 200, typically the actual hardware in the computing system. A register interface 250 facilitates communication between hardware 200 and the software of the system.

Continuing up the hierarchy, driver software 210 is considered the software that communicates with, i.e. reads and writes to, hardware 200. Typically, driver software 210 is highly specialized software that is specific to the actual hardware of the computing system. For example, the driver software in an Apple Macintosh model 9500/120 computer cannot generally be used in place of the driver software in a Toshiba model Tecra 730 computer. However, hardware and software manufactures have gone to great lengths to standardize register interface 250 so that they can reuse driver software 210 in a variety of different computing systems. Examples of driver software 210 include hard disk drivers, floppy disk drivers, serial port drivers, parallel port drivers, graphics port drivers, and mouse drivers.

An Application Programming Interface (API) 240 is provided between driver software 210 and operating system software 220 as well as between operating software 220 and application software 230. API 240 is a means of communicating between various layers of software. Specifically, API 240 refers to a standardized means of passing data between two different pieces of software.

Operating system software (also referenced herein as OS software) 220 is the layer of software which generally handles the tasks of the computing system. These tasks would include items such as opening a file for input, prioritizing interrupts to the system, and scheduling events for later processing. Examples of current operating systems include: Apple Computer, Inc. MacOS Version 8.1; Sun, Inc. SunOS Version 5.5.1, and Microsoft, Inc. Windows '95.

OS software 220 communicates with driver software 210 and with application software 230 using different APIs 240. Each API 240 is different because of different data communication needs. For example, OS software 220 generally communicates only data to driver software 210, with a small overhead of control information. In contrast, OS software 220 often communicates task information to and/or from application software 230, even though a high percentage of that task information is data.

Application software 230 is generally the highest level of software in a computing system. Typically, the user of the computing system communicates with application software 230 using a graphical user interface. Illustrative application software, such as Claris, Inc. ClarisWorks 4.0 (a word processing program), allows the user to open a text file, read the file, view the file, make changes to the file, save the file, and print the file. Based upon the specific requests of the user, application software 230 makes calls to OS software 220 via API 240B to accomplish one or more of the above tasks. However, typically application software 230 is still responsible for the actual processing of the data. In some computing systems, OS software 220 is used to help draw graphics and text on the screen. In this manner, application software 230 is not burdened with extra software that could be standardized for other applications. Note that although FIG. 2A shows a single application software 230, in general, a set of application software 230 actually communicates via a set of APIs 240B to OS software 220.

FIG. 2B illustrates API 240A between OS software 220 and driver software 210 in more detail. In API 240A, four basic functions have been defined as a means of communication between the two software layers. These four functions are: Open, Close, Read, and Write. The Open function is used by OS software 220 to initialize driver software 210 for its first usage. Similarly, the Close function is used by OS software 220 to halt the operation of driver software 210. These functions are typically used by OS software 220 to dynamically start and stop software drivers so that the computing system resources can be shared by various higher level software. In addition to the Open and Close functions, this API 240A includes Read and Write functions which are generally used to either write data to or read data from hardware 200 via driver software 210.

FIG. 2B illustrates a number of parameter blocks (PBs), wherein PBs are generally designated locations in memory for specific parameters. For example, in a DMA transfer, the source address, destination address, and length of the transfer need to be designated. These values are placed in memory locations (i.e. PBs). These memory locations are predefined so that the memory can efficiently communicate the data to software (note that the software has had knowledge imparted to it that describes which locations of the PB contain which important data).

A DMAC process typically takes place in three stages: initialization, data transfer, and termination. Referring back to FIG. 1, during the initialization stage, CPU 110 sets up the DMA process by loading source register 101 with a starting source data address, destination register 102 with a starting destination data address, and length register 103 with a length count. After such loading, CPU 110 directs DMAC 100 to start the data transfer operation.

At this point, DMAC 100 initiates data transfers from the data source to the data destination. For example, if data is to be moved from memory 120 to peripheral device 130, then DMAC 100 controls the data transfer between those two components. As data is transferred, source and destination address and length count registers 101–103 are updated. When the length count is decremented to zero, DMAC 100 enters the termination stage. During termination, DMAC 100 updates its status register (not shown) and, in some designs, generates an interrupt request (also not shown) to CPU 110.

In some prior art systems, DMAC 100 supports data transfers of non-contiguous blocks of memory. These transfers of DMAC 100 need to allow for the continuous transferring of data without the assistance of CPU 110. These so-called "chained" operations are accomplished by adding more control logic (not shown) and next register 104 in DMAC 100. Additionally, CPU 110 must have set up a plurality of contiguous parameters in memory readable by DMAC 100. These contiguous parameters are often referred to as a request block, and typically include a source start address, a destination start address, a length count for this transfer, and a pointer to the memory location of the next request block.

Each set of contiguous data transfers requires its own request block. For example, assume the system must transfer two blocks of 1000 pieces of data, but each block of data resides in different memory locations. In this case, CPU 110 simply builds two request blocks and loads the parameters from the first request block into registers 101–104 of DMAC 100. Then, DMAC 100 transfers the DMA data, as indicated by the first request block. Once length count register 103 is zero, DMAC 100 uses a next register 104 to reload registers 101–104 from the parameters contained in the second request block (e.g., next register 104 is a pointer to a location in memory 120 where an address of the next request block is stored). DMAC 100 then transfers the data block referenced by the second request block until length count register 103 is zero again. DMAC 100 in turn looks at next register 104, wherein a special flag value in next register 104 (e.g., a specialized "stop" token, such as a "0" value) indicates to DMAC 100 that all DMA data has been transferred. Note that both blocks of DMA data have been transferred without CPU 110 intervention. Once both blocks had been transferred, DMAC 110 enters the termination stage which updates internal registers and otherwise completes the DMA process.

Although many types of DMACs exist, none compensate for their register interface to software or bus overhead. Thus, prior art DMACs typically have high software and hardware latency requirements. "Latency" is the time required before a given operation is actually begun after the command to begin the operation has been given. For example, the latency from Operating System software 220 initiating a DMA process to the actual starting of the process includes the time delays associated with Operating System software 220, driver software 210, and hardware 200. This time period is inherently long because the procedure consumes additional CPU bus cycles, memory bandwidth, and CPU calculation time. Latency periods are wasteful of time, and can cause significant negative impact to system functionality. For example, in video games, latency problems can show up as "mushy" controls. Therefore, a need arises for a method and apparatus to significantly reduce the latency due to the combinations of software and hardware operations in the DMA process.

SUMMARY OF THE INVENTION

To describe the Intelligent DMA Controller (IDMAC) of the present invention, the following hierarchical terminology is used. A "DMA bus cycle" is an individual transfer of data between two points (either a fly-by which has only one bus cycle, or a non-fly-by which has two bus cycles). A "DMA transfer" is one or more bus cycles required to transfer data between a source and a destination. A "DMA transaction" is a continuous set of DMA transfers. Finally, a "DMA process", which describes a whole process from start to finish, includes one or more DMA transactions.

The IDMAC of the present invention addresses the problems of prior art DMACs by using two types of intelligence. First, the IDMAC uses control-wise intelligence to minimize the time spent transferring data between the various control and data processes of the system, thereby reducing DMA process (software and hardware) latency as well as CPU calculation time. Second, the IDMAC uses data-wise intelligence to effect manipulation of data on-the-fly according to dynamically read opcodes during the DMA process.

To get these two types of intelligence, the IDMAC replaces one or more layers of software with intelligent hardware. Additionally, the IDMAC is given specific knowledge of the structure of certain pieces of memory or hardware registers (e.g. PBs) used for Inter Process Communication. This specific knowledge can be imparted during the design phase of the IDMAC, or dynamically provided during its operation as system requirements dictate.

The IDMAC achieves its controlwise intelligence by understanding PBs. A PB can be as simple as a collection of IDMAC parameters in contiguous memory, or as complicated as multiple levels of memory indirection or indexing. The IDMAC gets all of its PB parameters directly from memory by utilizing its knowledge of the PB to obtain the parameters, dereferencing as required, and then begins transferring data between the source and destination as controlled by the PB(s). Examples of PB parameters are source address, destination address, transfer length, and data intelligence opcode. Note that the IDMAC allows for bidirectional nesting of PBs, thereby allowing for complete error recovery.

Because the IDMAC can also interpret complex PB structures, it can remove many layers of software compared to prior art DMACs. For example, the data movement operations associated with a word processing application that writes to a hard disk drive can be almost totally contained inside the hardware of the IDMAC. In this example, the PBs may have many levels of indirection caused by the application software to driver software flow. Because the IDMAC can directly interpret this set of complex structures, the software overhead can be decreased substantially. Additionally, because of the elimination of CPU cycles to effect the same procedure, the IDMAC of the present invention reduces the latency of the DMA transaction and increases performance.

The IDMAC also can add data-wise intelligence to the DMA process and therefore is capable of performing various types of manipulations to the data on-the-fly. In other words, the data flowing through the IDMAC is modified in real time, and does not consume additional DMA bus cycles. The IDMAC utilizes a Data Intelligence Unit, along with additional specific knowledge of memory or registers to achieve its data operations. These additional structures allow the Data Intelligence Unit to obtain parameters from the data stream before and/or during the DMA transactions. It then utilizes these parameters to alter the data of the DMA bus cycle. This altering can be done either on-the-fly, or by consuming additional bus cycles, depending upon system requirements.

BRIEF DESCRIPTION OF THE DRAWINGS

FIG. 2A illustrates the typical hierarchy of software and hardware in a conventional computing system.

FIG. 2B illustrates an Application Programming Interface between operating software and driver software in more detail.

DETAILED DESCRIPTION OF THE DRAWINGS

Figure 1:
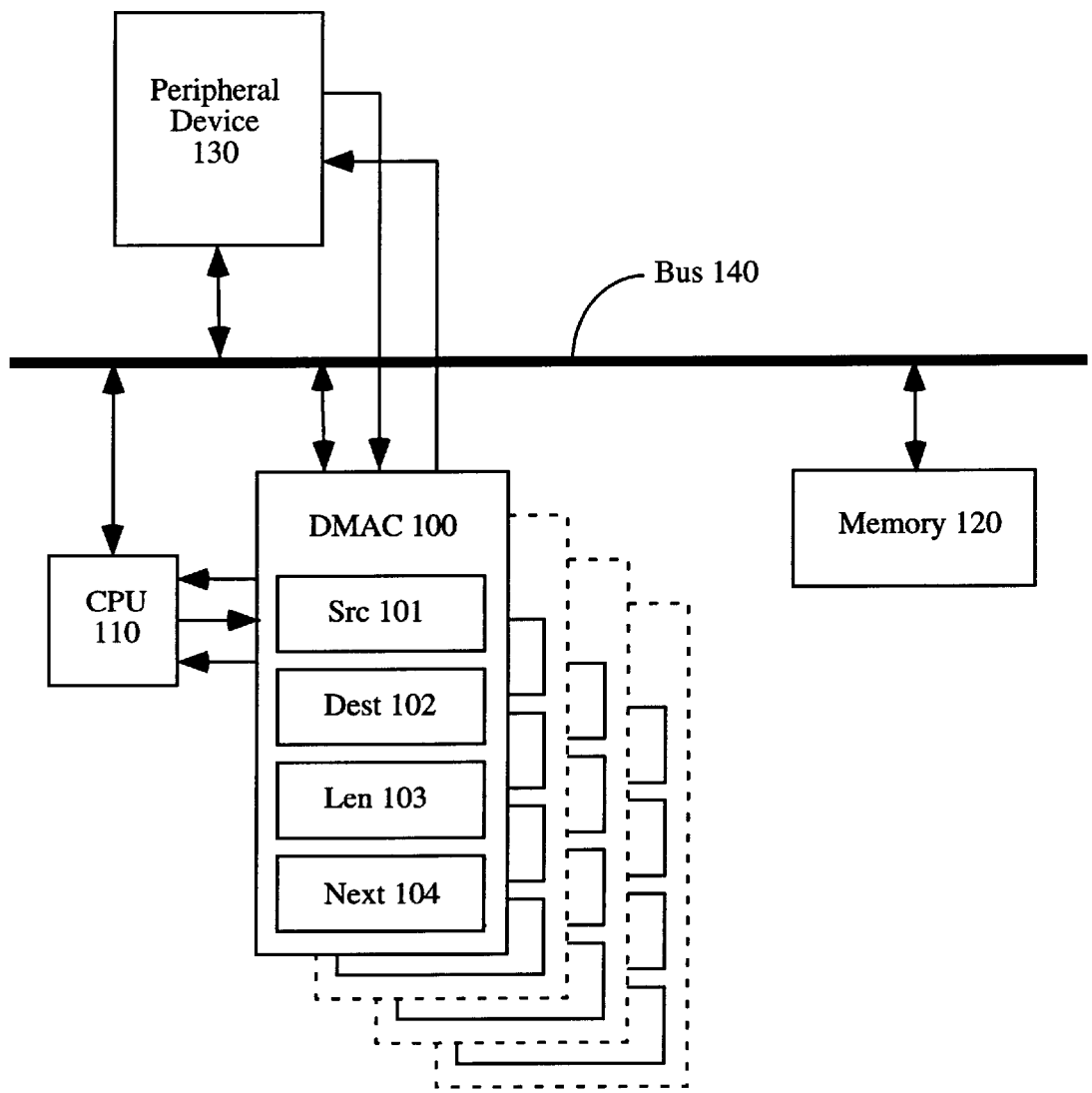
FIG. 1 shows a block diagram of a conventional computing system embodying a prior art DMAC.
Figure 3:
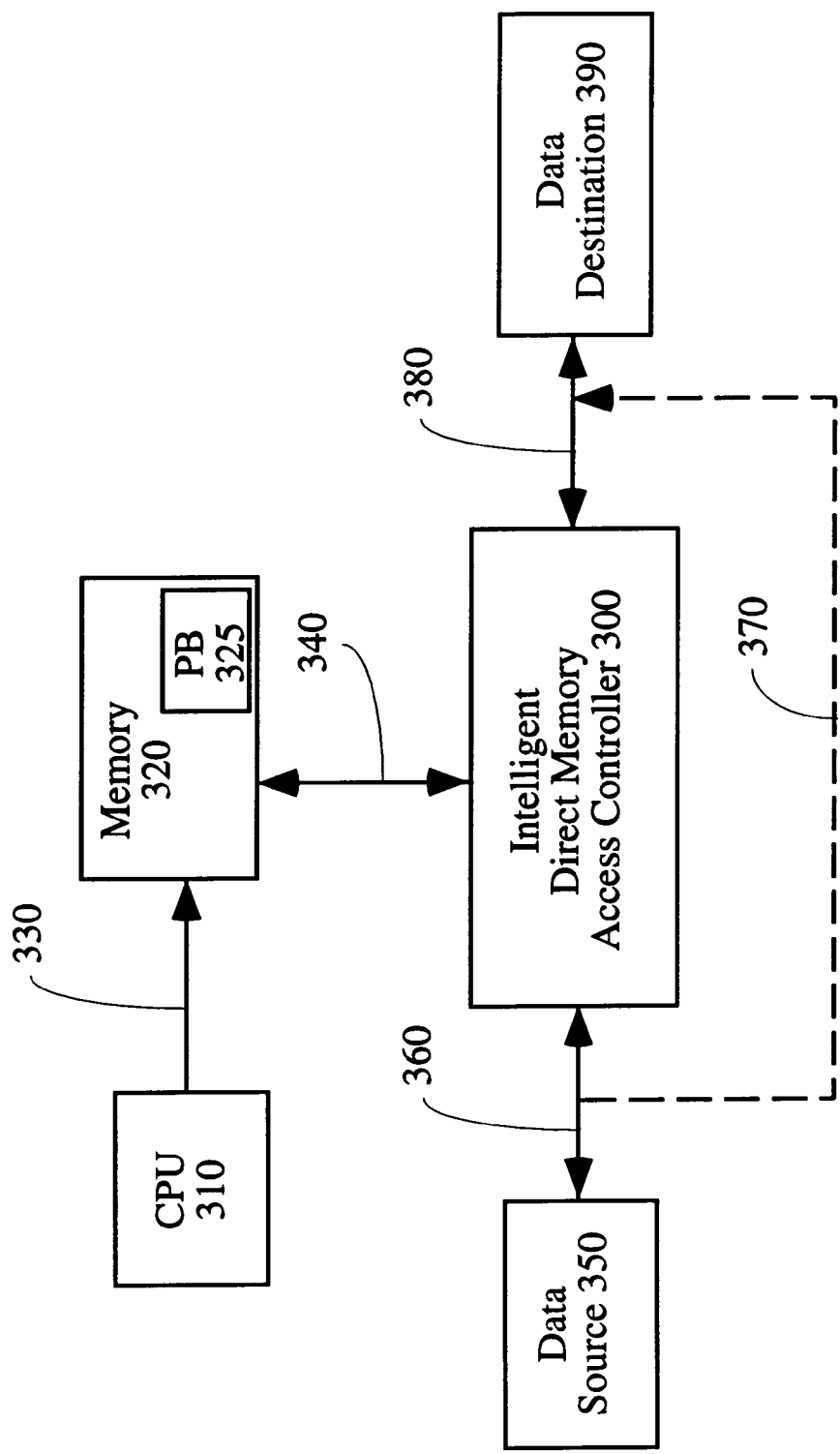
FIG. 3 illustrates a simplified block diagram of the Intelligent Direct Memory Access Controller (IDMAC) instantiated into a conventional computing system.

FIG. 3 illustrates the instantiation of an Intelligent Direct Memory Access Controller (IDMAC) 300 of the present invention into a conventional computing system. In this system, CPU 310 communicates information to a memory 320 via a bus 330. CPU 310 executes OS software 220 (FIG. 2), and utilizes API 240A to create a PB 325 in memory 320 for IDMAC 300. It is important to note that from the perspective of OS Software 220, it is simply writing to PB 325 as if it were communicating to driver software 210.

The appropriate level of software, typically driver software 210, starts a DMA process by writing the pointer to PB 325 to IDMAC 300, and then asking IDMAC 300 to begin initialization. Specifically, IDMAC 310 utilizes bus 340, which may be the same or different from bus 330, to read PB 325 from memory 320 and place the appropriate parameters from PB 325 into the internal registers (not shown) of IDMAC 300. Then, IDMAC 300 gains access to a source data bus 360 as well as a destination data bus 380. Once this access has been obtained, IDMAC 300 uses the contents of its internal registers to obtain data from the appropriate location in data source 350, and transfer it to the appropriate location in data destination 390.

In one embodiment, these accesses are serially processed. That is, IDMAC 300 first obtains access to data source 350, stores the data for that DMA bus cycle(s) internally, and then subsequently obtains access to data destination 390 to transfer the internally stored data. Therefore, this embodiment requires two separate cycles of bus access to transfer the data. Alternatively, IDMAC 300 utilizes data bus 370 as a means of transferring the data directly between data source 350 and data destination 390. These so called "fly-by" transfers may be used in high performance computer systems to increase the data transfer rate and decrease the bandwidth required for the DMA process. Note that although data buses 360, 370, and 380 are shown as separate, the actual implementation of the system and IDMAC 300 may permit all three buses to be one and the same physical data bus.

Figure 4:
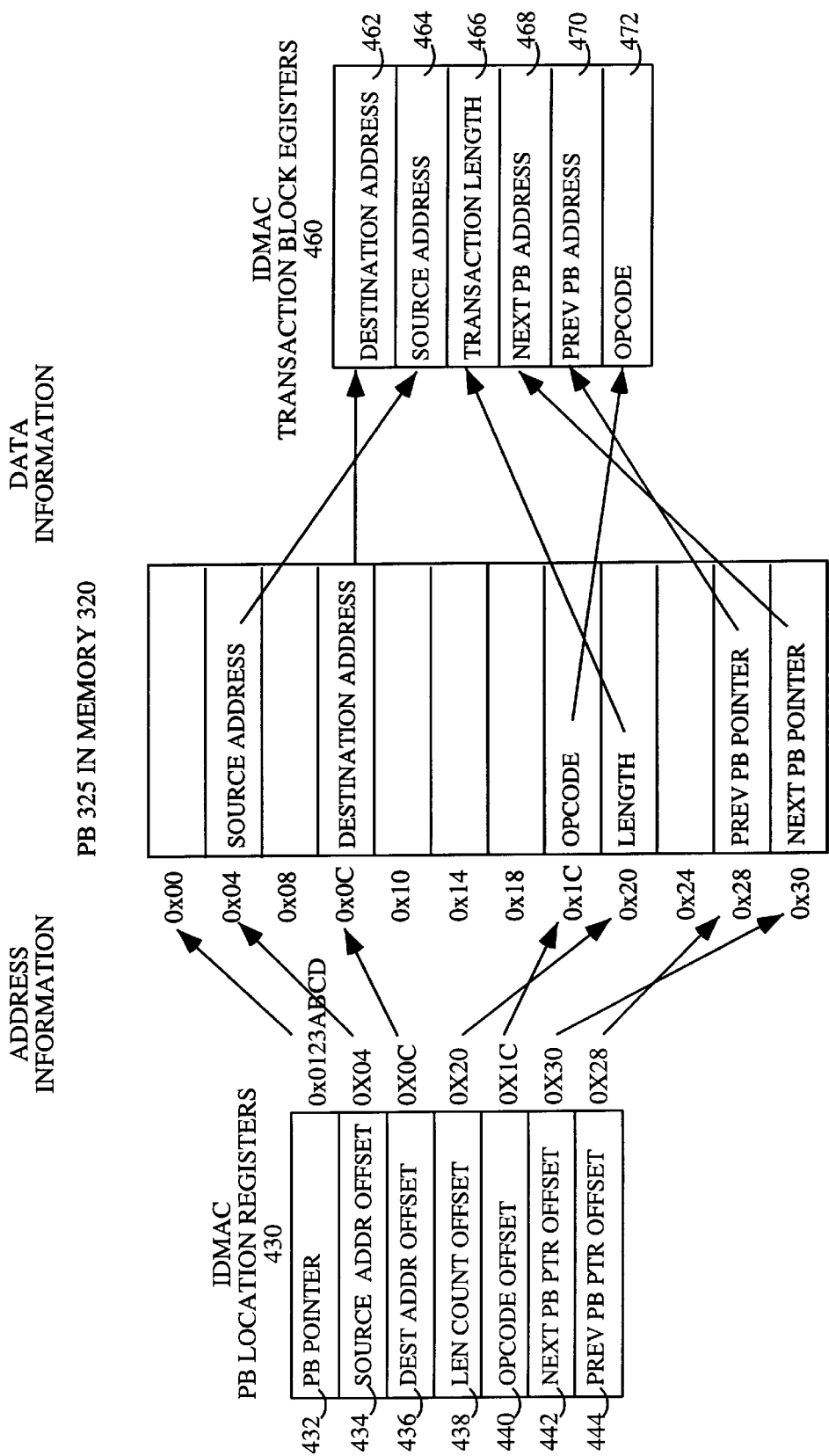
FIG. 4 illustrates a highly simplified register model of an IDMAC and its interface with a memory.

FIG. 4 illustrates a highly simplified register model of IDMAC 300 (FIG. 3) and its interface with memory 320. Specifically, FIG. 4 shows three components: IDMAC PB Location Registers (PBLRs) 430, PB 325 in memory 320, and IDMAC Transaction Block Registers (TBRs) 460. PB 325 in memory 320 is one example of the data structure of a PB written into memory 320 by OS software 220. The computing system uses PBLR 430 to input specific knowledge to IDMAC 300 where PB 325 is located in memory 320, and what its structure looks like.

PBLR 430 include a PB Pointer 432 and a set of offset registers. PB Pointer 432 is written by software to point to the location in memory 320 where the first word of PB 325 resides. A set of parameter offset registers are defined in PBLR 430 to describe the structure of PB 325. In general, the offset registers are written once, during the driver Open sequence, whereas the PB Pointer is written dynamically during the Read or Write sequence of the driver. The offset registers (Source Address Offset 434, Destination Address Offset 436, Length Count Offset 438, Opcode Offset 440, Next PB Pointer Offset 442, and Previous PB Pointer Offset 444) contain the offset value, from the first word of PB 325, to the contents of the respective parameter. For example, FIG. 4 illustrates that PB Pointer 432 contains the value of 0x0123ABCD, which in turns tells the IDMAC that PB 325 is located at address 0x01234ABCD. Source Address Offset 434 indicates that the source address is located at 0x04 words after the first location of PB 325. Thus, the IDMAC knows that the source address for the DMA transaction is located at 0x01234ABCD+0x04.

The other offset registers are located in the same manner, but represent different DMA parameters such as destination address, opcode, length, etc. Thus, the contents of the offset registers, when added to the contents of PB Pointer 432, give the actual address of the specific parameter in PB 325. In FIG. 4, PB 325 contains the actual data. This embodiment is the simplest view of IDMAC 300. In another more complex embodiment described in detail in reference to FIG. 7, PB 325 contains additional levels of indirection (e.g., pointers), and the definitions of the PBLR change to accommodate these additional levels.

Once IDMAC 300 knows the pointer to the PB and its offsets, and has been told to start the DMA process, IDMAC can begin to get the contents of PB 325, the DMA parameters, and place them in TBRs 460. IDMAC 300 begins this process by reading PB Pointer 432, and then using the pointer as a base address with each parameter offset being added to the base address to identify the unique location within PB 325 of the parameter in question. For example, Source Address Offset 434 is added to PB Pointer 432 to indicate the unique address in memory 320 (part of PB 325) of the source address. That data of the unique address is then written to Source Address Register 464 in TBRs 460. Similarly, using Destination Address Offset 436 results in the destination address contained in PB 325 to be written into Destination Address Register 462. This process continues until all required parameters have been stored in TBRs 460. IDMAC 300 uses TBRs 460 to store parameters for and control the actual DMA transaction. The contents of PB 325 are loaded into TBRs 460 by the control logic (not shown) of IDMAC 300. Once the data is in TBRs 460, the actual DMA transaction may begin.

Figure 5:
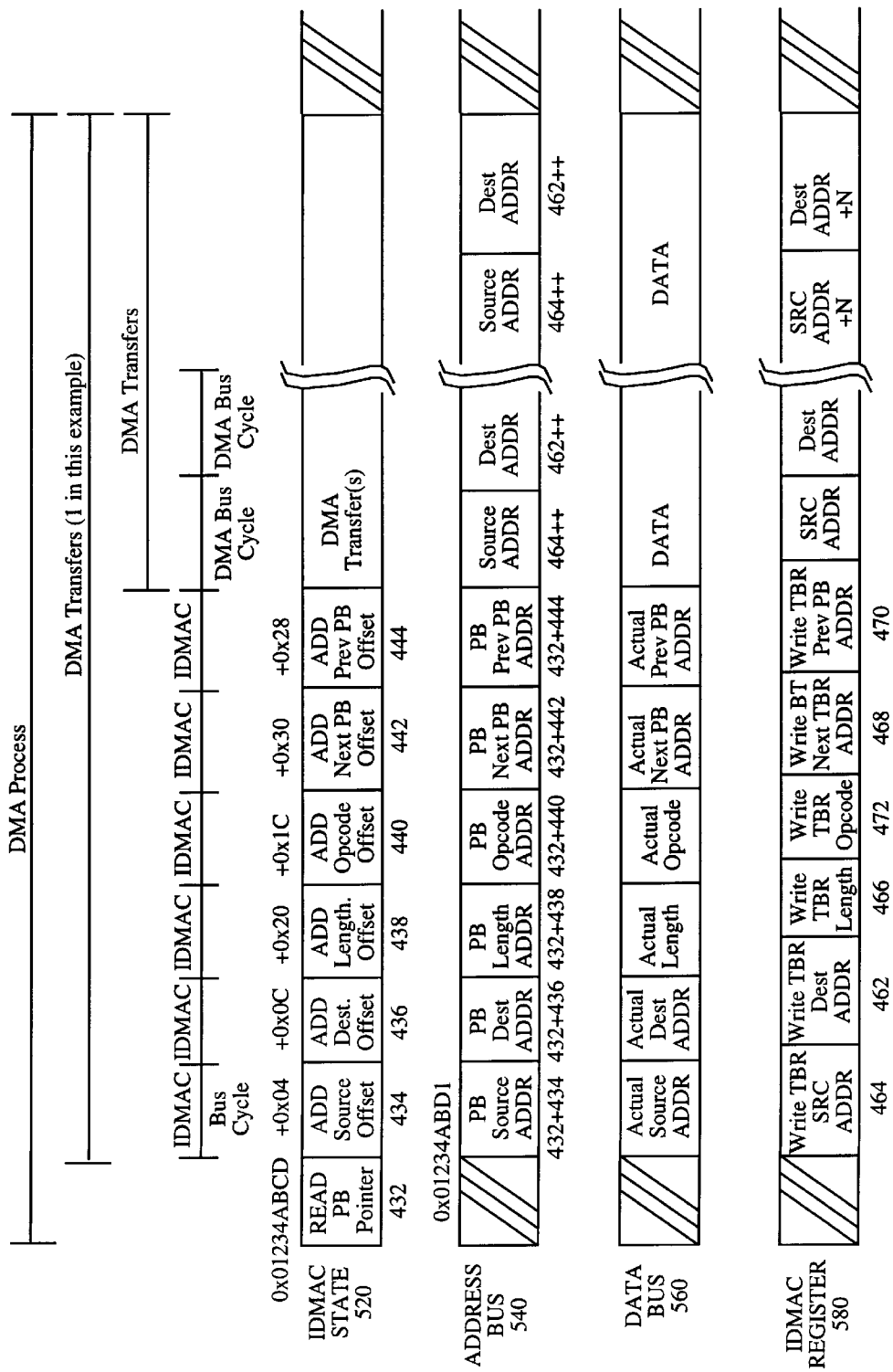
FIG. 5 illustrates a simplistic view of the address and data buses of a simple DMA process via the IDMAC.

FIG. 5 illustrates a simplistic view of the address and data buses of a simple DMA process of one DMA transaction via the IDMAC. Note that example internal IDMAC states, and registers are also included for reference purposes. In this example and referring also to FIG. 4, the IDMAC first reads the contents of PB Pointer 432, and then proceeds to read the offsets one at a time. Each time the IDMAC reads an offset, it adds the offset to the base address read from PB Pointer 432. This new address is then presented on a system address bus 540. The address presented on bus 540 causes the contents of PB 325 in memory 320 designated by the new address to show up on a data bus 560. The IDMAC then reads the data from data bus 560 and stores the data in the correct TBR (referenced as IDMAC Register 580 in FIG. 5). Thus, in one embodiment, the IDMAC first reads the source address from PB 325, and places it in Source Address Register 464. Then, the IDMAC proceeds to do the same until IDMAC Block Transaction Registers 580 (in FIG. 4, Destination Address Register 462, Length Register 466, Opcode Register 472, Next PB Address Register 468, and Prev PB Address Register 470) have been filled.

To begin the DMA transaction, the IDMAC reads the contents of Source Address Register 464, generates a source address on address bus 540, obtains the first portion of the data on data bus 560, and then generates a destination address by placing the contents of TBR Destination Address Register 462 on address bus 540 (i.e., where the data on bus 560 will be written to the destination). This procedure continues until TBR Length Register 466 indicates there is no additional data to transfer, thereby indicating that the entire DMA transaction is concluded. Note that this example is merely intended to show one of many possible modes of IDMAC operation, and not to limit its operation.

Figure 6:
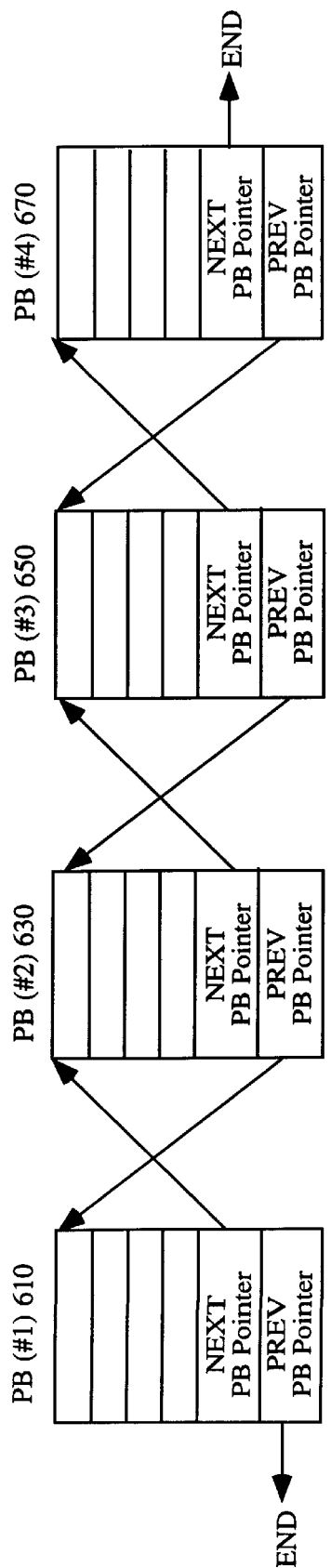
FIG. 6 illustrates the usage of a set of chained Parameter Blocks.

FIG. 6 illustrates the usage of a set of chained parameter blocks, wherein PBs 610 and 670 are considered the respective head and tail of the chain. Each PB defines a unique set of DMA transactions of data which taken together constitute the entire DMA process. In the example of FIG. 6, four different sets of transactions are used to accomplish the entire DMA process. The IDMAC begins by processing PB 610 according to the various parameters that it contains. Once the correct number of DMA bus cycles has been accomplished, the IDMAC will utilize the "NEXT PB PTR" parameter in PB 610 to reference a new PB, i.e. PB 630. The IDMAC loads the Next PB pointer value from PB 610 into the PBLR's PB Pointer 432 and begins a new transaction set. In this manner, the IDMAC can continue DMA bus cycles until it has exhausted every DMA bus cycle of every PB. The IDMAC will thus process the DMA transactions for PBs 610, 630, 650, and 670 in series. Once the IDMAC reaches the last transaction of PB 670, it will read the NEXT register which indicates to the IDMAC that PB 670 is the last PB.

Importantly, the PBs in one embodiment of the present invention also have a "PREV PB PTR" field which enables the IDMAC to backup DMA transactions. For example, if an error occurs during a write to a hard disk via the IDMAC, the IDMAC should begin writing data at the last track or sector boundary on the hard disk of data previously sent. Because this split is not guaranteed to reside within the DMA transaction controlled by the current PB, this embodiment provides that the PBs be traversable from both directions, thereby ensuring full error recovery. In other words, the recovery mechanism simply resets the pointers to the correct value to ensure retransmission of the correct amount of data from and to the correct locations, effectively overwriting the previous data that contained the error.

Figure 7:
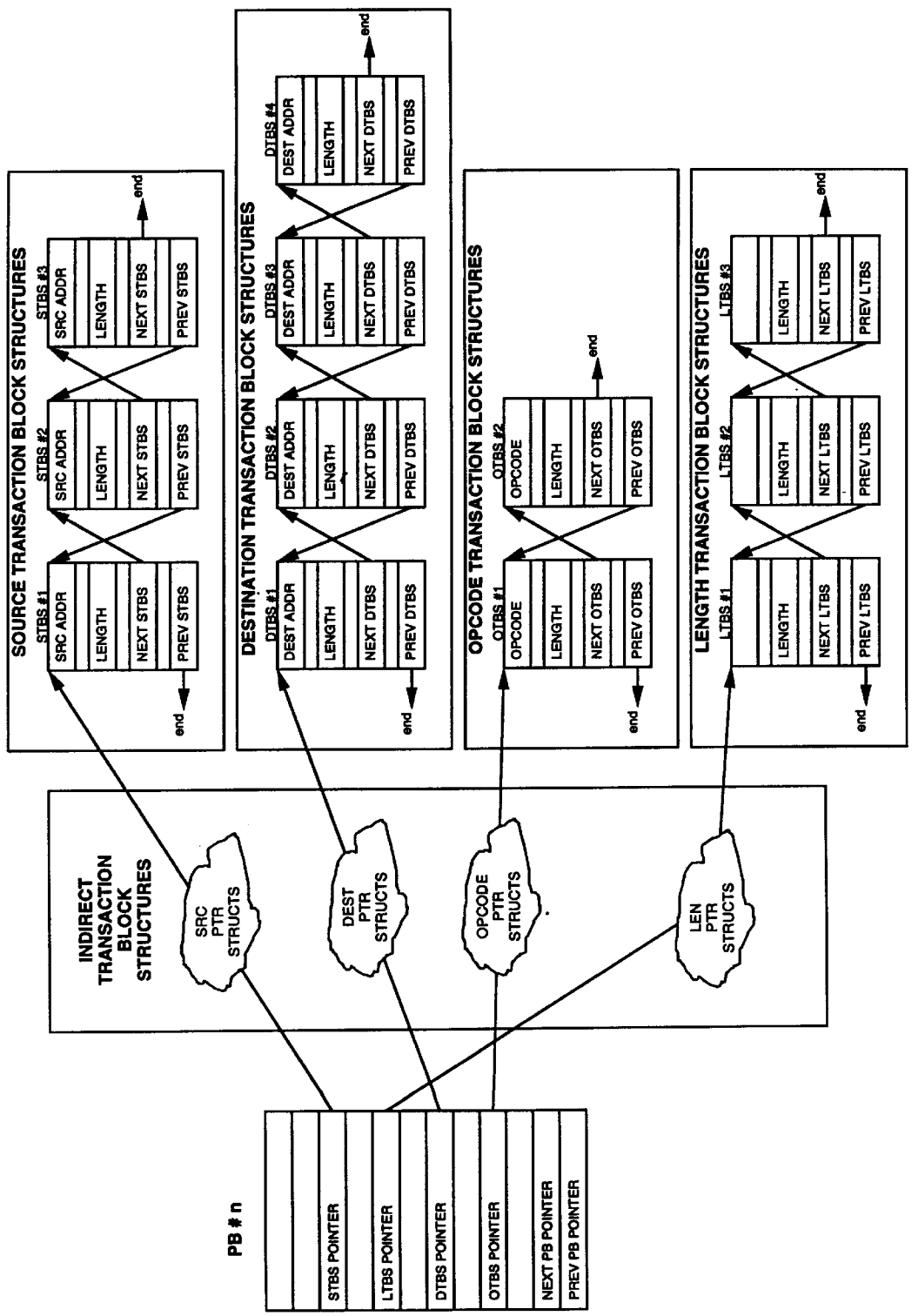
FIG. 7 shows an illustrative Complex OS Parameter Block decoded into various Transaction Block Structures (TBSs).

FIG. 7 shows an illustrative Complex OS Parameter Block decoded into various Transaction Block Structures (TBSs). The TBSs, structures in memory that were built using software programming concepts, store the initial control data for a set of DMA transaction(s) associated with a generic PB#n. For example, the Source Transaction Block Structure (STBS) #1 includes important parameters for the IDMAC, such as the address of the first piece of data for the source (SRC ADDR), the number of pieces of data to be transferred (LENGTH), and the next STBS (NEXT STBS) (e.g. STBS #2). Note that each TBS assumes various parameters will be contained within the IDMAC. However, if the additional area required for the implementation of these registers is prohibitive to the system, the actual memory locations could be used to store the intermediate data as long as the system can tolerate the additional memory cycles required to access that data, and altering the data would be permissible.

Although FIG. 7 only shows a single PB#n, links to other PBs may be provided via the Next PB Pointer register and the Prev PB Pointer register (as shown in FIG. 6). These two pointers allow the IDMAC to forward and reverse reference to other PBs, if any, during the DMA process. Note that in accordance with the present invention, the level of system complexity may vary. For example, one system may have a DMA process controlled by a single PB, with no Indirect Transaction Blocks Structures (explained in detail below), and minimal usage of the actual TBSs. However, another system might have a DMA process controlled by a whole series of PBs which utilize several levels of indirection to reach the final TBS. Finally, a third system might have two different DMA processes, wherein the first uses the simple DMA process and the second uses the complicated DMA process. Thus, the present invention ensures maximum system flexibility.

In the embodiment shown in FIG. 7, intervening structures of memory between the PB and the TBSs, called Indirect Transaction Block Structures (ITBSs), provide additional levels of software indirection. The ITBSs require the IDMAC to read their contents, and utilize those contents to generate another address according to the dictated system behavior. That behavior could be to utilize the address as an absolute address, or as an address relative to another, previous address defined by the system. The system designer needs to be aware of the existence of the ITBSs and add additional logic to the IDMAC to process these extra structures. For example, if the system designer knows that the Source Transfer Block Structure Pointer of a PB points to additional levels of address indirection before the actual STBS can be found, additional IDMAC register(s) and control logic must be added to dereference the intermediate memory locations into the final address of the first STBS.

FIG. 7 illustrates a variety of TBSs. It is important to note these are standard memory locations, implemented as hardware registers or actual memory. However, in accordance with the present invention, this memory is used in a novel manner. For example, the popular C programming language permits the creation of entities called "struct"s. These entities are filled with data that is valuable to the program(s) that is (are) running on the computing system. Structs can contain data of various widths, but the language identifies the width by how the struct is referenced. Similarly, the TBSs of FIG. 7 may store data of different widths, but the IDMAC understands this fact based on the context of the data. For example, in the Source Transaction Block Structures, the Source Address parameter might be a 32 bit number, whereas the Length parameter might only be a 16 bit number. Another important aspect of C structs, understood by those skilled in the art, is that structs can be referenced in a wide variety of forms. In a similar manner, the IDMAC can be given the requisite information to understand the contents and whereabouts of the TBSs.

While it may be preferable to have only a single TBS per DMA process, modern systems make this a very difficult feat. For example, if a computing system needs to write a file to hard disk, there is no guarantee that the memory that contains the file is contiguous. Additionally, there is no guarantee that the hard disk is not an array of hard disks. In these kinds of systems, multiple TBSs must be created. FIG. 7 illustrates one such system which includes Source Transaction Block Structures, Destination Transaction Block Structures, Opcode Transaction Block Structures, and Length Transaction Block Structures.

FIG. 7 shows three separate Source Transaction Block Structures (STBS); SBTS #1 contains one set of DMA Transactions, SBTS #2 contains another set of DMA transactions, and SBTS #3 contains the last set of DMA transactions for the source portion of the DMA process. Each SBTS has a Source Address and Length parameter. The Source Address parameter is the actual initial address to be used to obtain the data to be written to the destination. The Length parameter defines the number of sequential accesses from the Source Address for this set of DMA transactions. An optional Flags parameter (not shown) is used to communicate other control parameters to the IDMAC such as "incrementing", "decrementing", or "unchanged" with respect to the source address. This kind of flag can be used to implement IDMAC stacks, queues, or accessing single address I/O ports (i.e. RS-232 type communications). Additionally, the Flag parameter might indicate to the IDMAC that the memory of the source data is volatile and/or locked and therefore no error recovery is possible. The IDMAC may also utilize the Flags parameter location(s) to store various data to enhance Inter Process Communication between the IDMAC and the computing system. Note that not all applications need the Flags parameter(s), and therefore this parameter is considered optional.

In FIG. 7, each STBS also contains a Next STBS and Prev STBS. These parameters operate very similarly to the Next PB Pointer and Prev PB Pointer described above (see FIG. 6) in relation to PBs. Specifically, the Next STBS points forward to the next STBS, if there is one. The last STBS generally has a special token, such as a null, in the Next STBS field to indicate that it is the last STBS. Similarly, the Prev STBS points backwards to the previous STBS. The first STBS generally contains a special token, such as a null, in the Prev STSB field to indicate that it is the first STBS.

The Destination Transaction Block Structure (DTBS) is similar to the STBS. The primary difference lies in the fact that the DTBS contains a Destination Address parameter instead of a Source Address Parameter. The Opcode Transaction Block Structure (OTBS) is similar to the STBS and DTBS. The primary difference is that the OTBS contains an Opcode parameter. The Opcode parameter defines the datawise intelligence operation of the IDMAC, upon the DMA data, for the length of the data specified by the Length parameter in the OTBS.

The Length Transaction Block Structure (LTBS) is included for the sake of completeness, although it is not normally used in most systems. The purpose of the LTBS is to create the ability to link together sets of lengths for the overall DMA process transfer length. This mode might be used for certain types of "ping-pong" memory applications. In principle, the LTBS is just like the other TBSs except that it only contains Length, Next LTBS, and Prev LTBS parameters.

Importantly, the overall DMA process transfer length should be equal for all the source, destination, and length Transaction Blocks. That is, the IDMAC will consider an error condition if the summed length parameters of the SBTS do not equal the summed length parameters of the LTBS. Similarly, the summed length parameters of the DTBS must equal the summed length parameters of the LTBS. For example, if the STBS indicates X bytes of data have been transferred, but the LTBS indicates that X−1 bytes were supposed to be transferred, the IDMAC knows that an overrun of one byte occurred, and should therefore take appropriate action. The IDMAC may or may not consider an error condition if the summed length parameters of the OTBS do not equal the summed length parameters of the LTBS, depending upon system needs.

Table 1 lists six basic classes of registers that the IDMAC would contain internally to implement the example of FIG. 7. These classes are: DMA Process Registers (DPRs), Parameter Block Registers (PBRs), Parameter Block Location Registers (PBLRs), Indirect Transaction Block Registers (ITBRs), Transaction Block Pointer Registers (TPRs), and Transaction Block Registers (TBRs).

The DPR class is a set of registers used to help effect Inter-Process Communication between the IDMAC and the system in which it is installed. The DMA process flags register contains status information to/from the IDMAC about the DMA process. For example, the system might write a START flag to tell the IDMAC to begin a DMA process. Once that DMA process is complete, the IDMAC might write a FINISHED flag to tell the system the IDMAC has completed its task.

TABLE 1

| DMA PROCESS REGISTERS | PARAMETER BLOCK REGISTERS |
|---|---|
| •DMA Process Flags<br>•DMA Transfer Length<br>•DMA Transaction Last Completed Source Address<br>•DMA Transaction Last Completed Destination Address | •Previous PB Pointer<br>•Current PB Pointer<br>•Next PB Pointer |
| PB LOCATION REGISTERS | INDIRECT TRANSACTION BLOCK REGISTERS |
| •PB Pointer<br>•PB Source Transaction Block Structure Offset<br>•PB Destination Transaction Block Structure Offset<br>•PB Opcode Transaction Block Structure Offset<br>•PB Length Transaction Block Structure Offset<br>•Next PB Pointer Offset<br>•Previous PB Pointer Offset | •Source Indirect Transaction Block Register 1<br>•Source Indirect Transaction Block Register 2<br>•Destination Indirect Transaction Block Register 1<br>•Destination Indirect Transaction Block Register 2<br>•Opcode Indirect Transaction Block Register 1<br>•Opcode Indirect Transaction Block Register 2<br>•Length Indirect Transaction Block Register 1<br>•Length Indirect Transaction Block Register 2 |
| TRANSACTION BLOCK POINTER REGISTERS | TRANSACTION BLOCK REGISTERS |
| •Current STBS Pointer<br>•STBS Source Address Offset<br>•STBS Length Offset<br>•Prev STBS Offset<br>•Next STBS Offset<br>•Previous STBS Pointer | •Source Address Register<br>•Source Length Count Register<br>•Source Next TBS<br>•Source Previous TBS |
| •Current DTBS Pointer<br>•DTBS Destination Address Offset<br>•DTBS Length Offset<br>•Prev DTBS Offset<br>•Next DTBS Offset<br>•Previous DTBS Pointer | •Destination Address Register<br>•Destination Length Count Register<br>•Destination Next TBS<br>•Destination Previous TBS |
| •Current DTBS Pointer<br>•OTBS Destination Address Offset<br>•OTBS Length Offset<br>•Prev OTBS Offset<br>•Next OTBS Offset<br>•Previous OTBS Pointer | •Opcode Register<br>•Opcode Length Count Register<br>•Opcode Next TBS<br>•Opcode Previous TBS |
| •Current DTBS Pointer<br>•LTBS Destination Address Offset<br>•LTBS Length Offset<br>•Prev LTBS Offset<br>•Next LTBS Offset<br>•Previous LTBS Pointer | •Length Count Register<br>•Length Next TBS<br>•Length Previous TBS |

Other DPRs include the DMA Process Transfer Length Register, the DMA Transaction Last Completed Source Address Register, and the DMA Transaction Last Completed Destination Address Register. The DMA Process Transfer Length Register is a register which stores how many DMA Transfers have been completed. This register can be used in combination with the DMA Transaction Last Completed Source Address and DMA Transaction Last Completed Destination Address Registers to inform the system of the exact status of a DMA transfer, or to enable the system to recover from some error that the IDMAC was unable to recover on its own.

The PBR class is a small set of registers which contain the pointers to the Previous, Current, and Next PB during the DMA process. These registers are used internally by the IDMAC as a means of error recovery, if an error occurs during the DMA process. The Previous PB Pointer register holds the contents of the last PB pointer that has already exhausted all DMA transactions. Similarly, the Current PB Pointer register holds the contents of the current PB pointer so that the IDMAC can properly address memory for the various DMA parameters it needs. When the IDMAC reads the current PB, it also reads the Next PB Pointer location within that PB so that it will know where the next PB will be in memory. The contents of that area are moved into the Parameter Block Register's Next PB Pointer register. Once the current PB has no additional DMA transactions, the Next PB Pointer register will be evaluated to see what to do next. If the Next PB Pointer register contains the special "end" token, then the DMA process terminates. If it contains the address of another PB, then the IDMAC transfers the contents of the Current PB Pointer register to the Previous PB Pointer register, transfers the contents of the Next PB Pointer register to the Current PB Pointer register, and begins the next set of DMA transactions as parametrized in the new PB.

The PBLR class is a set of registers which are used to "understand" the memory structure of the PB. As described previously, the PBLRs consist of a PB Pointer, which is written by the computing system to indicate where the PB is in memory, and a set of offsets from that location to indicate where various IDMAC parameters are within the PB. Note that in one embodiment, the PB Pointer may be the same physical IDMAC register as the DPR Current PB Pointer. The offset registers can include the following: PB Source Transaction Block Structure Offset, PB Destination Transaction Block Structure Offset, PB Opcode Transaction Block Structure Offset, PB Length Transaction Block Structure Offset, Next PB Pointer Offset, and Previous PB Pointer Offset. These offset registers store values which indicate where within the PB the respective parameter exists, relative to the beginning of the PB. For example, if the PB Pointer Register indicates that the PB is located at location 0x1000 in memory, and the PB Source Transaction Block Structure Offset Register contains a 0x10, the Source Transaction Block Structure parameter will be found at location 0x1010 in memory.

The PB Location Registers are thus used to help the IDMAC understand the structure of the PB so that the IDMAC can obtain the parameters required for its operation. Note that the more complex embodiment of FIG. 7 alters the definition of the contents of the PBLR and how they are used. Specifically, in the simple example of FIG. 4, the PBLR offsets obtain actual DMA parameters, whereas in FIG. 7, the PBLR offsets are used to obtain the addresses of structs, with possible multiple levels of indirection, to eventually get the actual DMA parameters.

The ITBRs make up another of the six classes of registers in the IDMAC. Examples of these registers include Source Indirect Transaction Block Register 1, Source Indirect Transaction Block Register 2, Destination Indirect Transaction Block Register 1, Destination Indirect Transaction Block Register 2, Opcode Indirect Transaction Block Register 1, Opcode Indirect Transaction Block Register 2, Length Indirect Transaction Block Register 1, and Length Indirect Transaction Block Register 2. These registers are merely storage locations in the IDMAC to enable the dereferencing of pointers to the actual TBS which contains the parametric data that the IDMAC needs to complete DMA transactions. It should be noted that the ITBRs are not required for all applications. The IDMAC must be designed to know about the existence of additional levels of memory indirection before the actual parameters are found in memory. This knowledge is generally imparted to the IDMAC during its design phase. If the designer knows that the PB contains a pointer to a pointer, rather than a pointer to a TBS, the designer instantiates an ITBR to handle the dereference of the pointer into the final address of the TBS. Thus, for every parameter in the PB which needs to be dereferenced, an additional register in the ITBR must be added.

Table 1 illustrates two levels of dereferencing for each parameter before the actual TBS can be found in memory. Thus, for any given parameter, the ITBR contains two registers (1 and 2) to hold the intermediate addresses for dereferencing. The dereferencing occurs by using the address contained by the PB Pointer and parameter offset to obtain another address which is stored in the first register. This first register is then used to generate an address to obtain yet another address which is stored in the second register. This second register is then used to generate the final address to the actual TBS. Thus, two levels of indirect memory access are dereferenced. In some embodiments of the present invention, control logic in the IDMAC simply reuses the same register multiple times, thereby eliminating the need for two registers (although not enabling full error recovery).

The next class of registers in the IDMAC is the Transaction Block Pointer Registers (TBPRs). These registers can be thought of as analogous to the PB Location Registers, except that they deal with TBSs instead of PBs. Table 1 illustrates four types of TBPRs (to conform to FIG. 7) although different applications may require more or less TBPRs. The four types correspond to four DMA parameters: Source Address, Destination Address, Opcode, and Length. Each of the four types has similar sets of registers to enable the IDMAC to obtain the requisite parameter.

The first type of TBPR is the Source address type. In this example, this type of TBPR contains six registers: Current STBS Pointer, STBS Source Address Offset, STBS Length Offset, Prev STBS Offset, Next STBS Offset, and Previous STSB Pointer. The Current STBS Pointer register indicates to the IDMAC where the current Source Transaction Block Structures start address is in memory. The STBS Source Address Offset indicates where in main memory, relative to the beginning of the Source Transaction Block Structure that the IDMAC may find the Source Address for the DMA transaction. The STBS Length Offset indicates where in main memory, relative to the beginning of the Source Transaction Block Structure, that the IDMAC may find the length of the DMA transaction for the source address. The Prev STBS Offset indicates where in main memory, relative to the beginning of the Source Transaction Block Structure, that the IDMAC may find the pointer to indicate where the previous STBS exists in main memory, or a flag to indicate that this STBS is the first one in the series. The Next STBS Offset indicates where in main memory, relative to the beginning of the Source Transaction Block Structure, that the IDMAC may find the pointer to indicate were the next STBS exists in main memory, or a flag to indicate that this STBS is the last one in the series. Finally, the Previous STBS Pointer holds the contents of the Current STBS Pointer from the last DMA transactions of the previous STBS. The Previous STBS pointer thus allows a direct means of error recovery, should the IDMAC encounter an error condition.

The second type of TBPR, analogous to the first, is the Destination Address type. These TBPRs are identical in function to the Source Address versions, but deal with obtaining the Destination IDMAC parameters. Accordingly, the second type of TBPR registers consists of: Current DTBS Pointer, DTBS Destination Address Offset, DTBS Length Offset, Prev DTBS Offset, Next DTBS Offset, and Previous DTBS pointer (wherein DTBS means Destination Transaction Block Structure).

The third type of TBPR, similar to the first and second types, is the Opcode type. These TBPRs serve identical functions, as illustrated for the source address and destination address registers, but operate on the IDMAC opcode parameter. Accordingly, the third type of TBPR registers consists of: Current OTBS Pointer, OTBS Opcode Address Offset, OTBS Length Offset, Prev OTBS Offset, next OTBS Offset, and Previous OTBS Pointer (wherein OTBS means Opcode Transaction Block Structure).

The fourth type of TBPR lacks one parameter, but is otherwise similar to the previous TBPRs. This fourth type of TBPR is the collection of registers required to obtain the IDMAC DMA process length parameter. Like the other three types, the fourth type has a Current LTBS Pointer, LTBS Length Offset, Prev LTBS Offset, Next LTBS Offset, and Previous LTBS Pointer (wherein LTBS means Length Transaction Block Structure). However, since this fourth type of TBPR is dealing with the length of the DMA process, there is no address or opcode parameter required (STSB Source Address Offset in the case of the first type, DTBS Destination Address Offset in the case of the second type, and OTBS Opcode Address Offset in the case of the third type).

The four types of TBPRs in combination allow the IDMAC to interpret the Transaction Block Structures of the DMA process. These definitions may be changed on the fly by altering the contents of the TBPR, or may be statically set upon initial design of the IDMAC by the designer.

The last class of IDMAC registers is the Transaction Block Register (TBR). These registers hold the actual relevant parameters for the DMA transaction. In general, the TBRs, along with the DMA process registers, make up the registers which contain all actual DMA parameters. Thus, the other four classes of registers are used to enable the gathering of parameters into the TBR.

The TBR has four types of registers, analogous to the four types of the TBPR. These four types are: Source Address, Destination Address, Opcode, and Length. The four types are substantially similar.

The TBR type that is used to store Source Address consists of four registers: Source Address Register, Source Length Count Register, Source Next TBS, and Source Previous TBS. The Source Address register contains the source address for the DMA bus cycles. The Source Length Count register contains the value of how many pieces of data are to be transferred from the source address specified by the Source Address Register. The Source Next TBS indicates the actual location of the next Source Transaction Block Structure (STBS). This parameter will be placed into the TBPR's Current STBS Pointer when the Source Length Count has expired. If an error were to occur during a transaction that required the DMA transaction to back up past the amount of data represented in the current STBS, the Source Previous TBS could be used to quickly reload the IDMAC for error recovery processing.

The TBR type used to store Destination Address consists of the same four kinds of registers as the source address. These registers are: Destination Address register, Destination Length Count Register, Destination Next TBS, and Destination Previous TBS. The Destination Address register contains the actual destination address for the DMA transaction, whereas the Destination Length Count Register contains the count of the number of pieces of data to transfer via DMA into the Destination location specified by the Destination Address Register. The Next and previous TBS registers function identically to the source address registers previously described. Note that the source length count and destination length count need not be equal, thereby allowing the source and/or destination to be as fragmented as may be required to support the DMA process. In general, this kind of mechanism is useful for Operating Systems which utilize scatter/gather techniques for disk I/O.

The third type of TBR contains the Opcode registers. These registers are: the Opcode Register, the Opcode Length Count Register, the Opcode Next TBS, and the Opcode Previous TBS. These registers are very similar in function to the source and destination address TBRs. One important difference is that the Opcode register stores the actual opcode to be processed for the amount of data specified by the Opcode Length Count Register. Thus, where the Source Address and Destination Address registers store the active address (which increments, decrements, or remains unchanged, as specified by various flags (not shown)), the Opcode Register stores the same value for the duration of data specified. This allows the datawise intelligence of the IDMAC to operate on the DMA data, as specified by the Opcode, for the specified duration of data. The Opcode next and previous TBS functions behave the same as the Source and Destination Address TBRs.

The Final TBR type is the Length Count type. This type of register includes only three registers: the Length Count Register, the Length Next TBS, and the Length Previous TBS. The Length Count Register stores the length count for the TBS in memory. In one embodiment, one TBS indicates the entire DMA process's length count. However, the IDMAC allows the flexibility to encode the length count into a series of TBSs, should the computing system need such. In such a system, the IDMAC may use additional control logic to facilitate reading of the Length TBSs for the entire DMA process prior to the start of DMA transactions so that the IDMAC can check for data overrun or underrun conditions throughout the DMA process. Thus, the designer would need to determine if this is a system requirement, and implement appropriate control logic accordingly. The Length Next and Previous TBS registers function as illustrated for the source address TBR.

Table 2 illustrates an example of what the Operating System (OS)(or other level of software) might do to "Open" or "Initialize" the IDMAC (note that this process is roughly analogous to the "Open" API of Driver Software 210 (FIG. 2A)). In the Open process, the CPU of the computing system will normally initialize the values of the PBLR and TBPR so that the IDMAC will be enabled to understand the structure of the PB and TBS. Additionally, the CPU might cause aspects of the IDMAC internal logic to be reconfigured, as required by the needs to the system.

For example, if the IDMAC presents several channels of DMA as available resources, the IDMAC may need to have those channels configured such that a first channel uses all of the resources wherein a second channel does not. This configuring may necessitate altering the control logic or state machine of the IDMAC during the Open stage.

TABLE 2

OPEN
Initialize PBLR Offset Values
PB STBS Offset
PB DTBS Offset
PB OTBS Offset

TABLE 2-continued

PB LTBS Offset
Next PB Pointer Offset
Prev PB Pointer Offset
Initialize TBPR Offset Values
STBS Source Address Offset
STBS Length Offset
Prev STBS Offset
Next STBS Offset
DTBS Destination Address Offset
DTBS Length Offset
Prev DTBS Offset
Next DTBS Offset
OTBS Opcode Offset
OTBS Length Offset
Prev OTBS Offset
Next OTBS Offset
LTBS Length Offset
Prev LTBS Offset
Next LTBS Offset Table 2 shows an example of the initialization that might take place with the registers shown in Table 1. Note that this list is not inherently an exhaustive list, and one skilled in the art may add or subtract registers and initializations as required by the system. Generally speaking, two sets of registers need to be initialized to known values: Parameter Block Location Registers (PBLRs) and Transaction Block Pointer Registers (TBPRs). The PBLR contains the pointer to the PB and a set of offsets that the initialization code will set. The offset parameters must be set up at least once so that the IDMAC can correctly access the requisite data from main memory. Likewise, the TBPR also contains a pointer register and a set of offsets that the initialization code will set. Importantly, the pointer registers of both the PBLR and TBPR are not required to be set because they will dynamically vary depending upon the DMA operation. It should again be noted that once the offsets have been placed in the registers, the IDMAC need only have the PB Pointer register of the PBLR filled in, and then the IDMAC can identify all other relevant parameters from the structures in memory.

Table 3 is an example representation of the bus cycles that the IDMAC would undergo in a typical DMA process. In one embodiment, the bus cycle is a single clock cycle Address and Data phase. In other embodiments, the bus cycle may be a multicycle and/or asynchronous system of transferring information. It is important to note that the example of Table 3 illustrates the DMA transfers as if the source and destination were separate bus cycles. In other embodiments, the DMA transfers are done on-the-fly such that the source and destination occupy a single bus cycle instead of two.

TABLE 3

DMA PROCESS
CPU write PB Pointer in PBLR
CPU writes DMA Process Flag 'Start' IN DPR
IDMAC Prepare for DMA Process
    Get external bus for data transfers
    Bus cycle 1:
        Source Indirect Transaction Block Register 1 <= (PB Pointer + PB STBS Offset)
    Bus cycle 2:
        Source Indirect Transaction Block Register 2 <= (Source Indirect Transaction Block Register 1)
    Bus cycle 3:
        Current STBS Pointer <= (Source Indirect Transaction Block Register 2)
    Bus cycle 4:
        Destination Indirect Transaction Block Register 1 <= (PB Pointer + PB DTBS Offset)
    Bus cycle 5:
        Destination Indirect Transaction Block Register 2 <= (Destination Indirect Transaction Block Register 1)
    Bus cycle 6:
        Current DTBS Pointer <= (Destination Indirect Transaction Block Register 2)
    Bus cycle 7:
        Opcode Indirect Transaction Block Register 1 <= (PB Pointer + PB OTBS Offset)
    Bus cycle 8:
        Opcode Indirect Transaction Block Register 2 <= (Opcode Indirect Transaction Block Register 1)
    Bus cycle 9:
        Current OTBS Pointer <= (Opcode Indirect Transaction Block Register 2)
    Bus cycle 10:
        Length Indirect Transaction Block Register 1 <= (PB Pointer + PB LTBS Offset)
    Bus cycle 11:
        Length Indirect Transaction Block Register 2 <= (Length Indirect Transaction Block Register 1)
    Bus cycle 12:
        Current LTBS Pointer <= (Length Indirect Transaction Block Register 2)
    Bus cycle 13:
        PBR Previous PB Pointer <= (PB Pointer + PBLR Previous PB Pointer Offset)
    Bus cycle 14:
        PBR Next PB Pointer <= (PB Pointer + PBLR Next PB Pointer Offset)
    Bus cycle 15:
        TBR Source Next TBS <= (Current STBS Pointer + Next STBS Offset)
    Bus cycle 16:
        TBR Source Prev TBS <= (Current STBS Pointer + Previous STBS Offset)
    Bus cycle 17:
        TBR Source Address Register <= (Current STBS Pointer + STBS Source Address Offset)
    Bus cycle 18:
        TBR Source Length Count Register <= (Current STBS Pointer + STBS Length Offset)
    Bus cycle 19:
        TBR Destination Next TBS <= (Current DTBS Pointer + Next DTBS Offset)
    Bus cycle 20:
        TBR Destination Prev TBS <= (Current DTBS Pointer + Previous DTBS Offset)
    Bus cycle 21:
        TBR Destination Address Register <= (Current DTBS Pointer + DTBS Destination Address Offset)
    Bus cycle 22:
        TBR Destination Length Count Register<=(Current DTBS Pointer + DTBS Destination Length Offset)
    Bus cycle 23:
        TBR Opcode Next TBS <= (Current OTBS Pointer + Next OTBS Offset)
    Bus cycle 24:
        TBR Opcode Prev TBS <= (Current OTBS Pointer + Previous OTBS Offset)
    Bus cycle 25:
        TBR Opcode Register <= (Current OTBS Pointer + OTBS Opcode Address Offset)
    Bus cycle 26:
        TBR Opcode Length Register <= (Current OTBS Pointer + OTBS Length Offset)
    Bus cycle 27:
        TBR Length Next TBS <= (Current LTBS Pointer + Next LTBS Offset)
    Bus cycle 28:
        TBR Length Prev TBS <= (Current LTBS Pointer + Previous LTBS Offset)
    Bus cycle 29:
        TBR Length Count Register <= (Current LTBS Pointer + LTBS Length Offset)
IDMAC DMA Transaction #1 {Can be bursty transaction if bus supports}
    Bus cycle 30: {DMA Source Data}
        IDMAC Data Intelligence Register(s) <= (Source Address Register++).
            Source Length Count --
            IDMAC Data Intelligence operation on data
    Bus cycle 31: {DMA Destination Data}
        (Destination Address Register++) <= IDMAC Data Intelligence Register
            Destination Length Count --
            Opcode Length Count --
            Length Count --
    . . .
    Bus cycle n: {DMA Source Data}
        IDMAC Data Intelligence Register(s) <= (Source Address Register++)
            Source Length Count -- (NOW at ZERO)
            IDMAC Data Intelligence operation on data
    Bus cycle n+1: {DMA Destination Data}

TABLE 3-continued

```
            (Destination Address Register++) <= IDMAC Data Intelligence Register
                Destination Length Count --
                Opcode Length Count --
                Length Count --
                TBPR Previous STBS Pointer <= TBPR Current STBS Pointer
                TBPR Current STBS Pointer <= TBR Source Next TBS
IDMAC Get More DMA Parameter Data (next Source Transaction Block Structure)
    Bus cycle n+2:
        TBR Source Next TBS <= (TBPR Current STBS Pointer + TBPR Next STBS Offset)
    Bus cycle n+3:
        TBR Source Prev TBS <= (TBPR Current STBS Pointer + TBPR Previous STBS Offset)
    Bus cycle n+4:
        TBR Source Address Register <= (TBPR Current STBS Pointer + TBPR STBS Source Address Offset)
    Bus cycle n+5:
        TBR Source Length Count Register <= (TBPR Current STBS Pointer + TBPR STBS Length Offset)
IDMAC DMA Transaction #2 {Can be bursty transaction if bus supports}
    Bus cycle n+6: {DMA Source Data}
        IDMAC Data Intelligence Register(s) <= (Source Address Register++)
            Source Length Count --
            IDMAC Data Intelligence operation on data
    Bus cycle n+7: (DMA Destination Data)
        (Destination Address REgister++) <= IDMAC Data Intelligence Register
            Destination Length Count --
            Opcode Length Count --
            Length Count --
    . . .
    Bus cycle m: {DMA Source Data}
        IDMAC Data Intelligence Register(s) <= (Source Address Register++)
            Source Length Count --
            IDMAC Data Intelligence operation on data
    Bus cycle m+1: {DMA Destination Data}
        (Destination Address register++) <= IDMAC Data Intelligence Register
            Destination Length Count == {NOW at ZERO}
            Opcode Length Count --
            Length Count --
            TBPR Previous DTBS Pointer <= TBPR Current DTBS Pointer
            TBPR Current DTBS Pointer <= TBR Destination Next TBS
IDMAC Get More DMA Parameter Data {next Destination Transaction Block Structure}
    Bus cycle m+2:
        TBR Destination Next TBS <= (TBPR Current DTBS Pointer + TBPR Next TBS Offset)
    Bus cycle m+3: {This bus cycle could be saved, since param is already known}
        TBR Destination Prev TBS <= (TBPR Current DTBS Pointer + TBPR Previous DTBS Offset)
    Bus cycle m+4:
        TBR Dest Address Register <= (TBPR Current DTBS Pointer + TBPR DTBS Dest Address Offset)
    Bus cycle m+5:
        TBR Dest Length Count Register <= (TBPR Current DTBS Pointer + TBPR DTBS Length Offset)
IDMAC DMA Transaction #3 {Can be bursty transaction if bus supports}
    Bus cycle m+6: {DMA Source Data}
        IDMAC Data Intelligence Register(s) <= (Source Address Register++)
            Source Length Count --
            IDMAC Data Intelligence operation on data
    Bus cycle m+7: {DMA Destination Data}
        (Destination Address Register++) <= IDMAC Data Intelligence Register
            Destination Length Count --
            Opcode Length Count --
            Length Count --
    . . .
    Bus cycle x: {DMA Source Data}
        IDMAC Data Intelligence Register(s) <= (Source Address Register++)
            Source Length Count --
            IDMAC Data Intelligence operation on data
    Bus cycle x+1: {DMA Destination Data}
        (Destination Address Register++) <= IDMAC Data Intelligence Register
            Destination Length Count -- {NOW at ZERO}
            Opcode Length Count --
            Length Count --
            TBPR Previous DTBS Pointer <= TBPR Current DTBS Pointer
            TBPR Current DTBS Pointer <= TBR Destination Next TBS
IDMAC Get More DMA Parameter Data {next _ Transaction Block Structure}
    . . .
IDMAC DMA Transaction #Z {Can be bursty transaction if bus supports}
    Bus cycle k: {DMA Source Data}
        IDMAC Data Intelligence Register(s) <= (Source Address Register++)
            Source Length Count --
            IDMAC Data Intelligence operation on data
    Bus cycle k+1: {DMA Destination Data}
        (Destination Address Register++) <= IDMAC Data Intelligence Register
            Destination Length Count --
            Opcode Length Count --
```

TABLE 3-continued

```
            Length Count --
        ...
        Bus cycle k+2: {DMA Source Data}
            IDMAC Data Intelligence Register(s) <= (Source Address Register++)
                Source Length Count -- {NOW at ZERO}
                IDMAC Data Intelligence operation on data
        Bus cycle k+3: {DMA Destination Data}
            (Destination Address Register++) <= IDMAC Data Intelligence Register
                Destination Length Count -- {NOW at ZERO}
                Opcode Length Count -- {NOW at ZERO}
                Length Count -- {NOW at ZERO}
                TBPR Previous STBS Pointer <= TBPR Current STBS Pointer
                TBPR Current STBS Pointer <= TBR Source Next TBS
                TBPR Previous DTBS Pointer <= TBPR Current DTBS Pointer
                TBPR Current DTBS Pointer <= TBR Destination Next TBS
                TBPR Previous OTBS Pointer <= TBPR Current OTBS Pointer
                TBPR Current OTBS Pointer <= TBR Opcode Next TBS
                TBPR Previous LTBS Pointer <= TBPR Current LTBS Pointer
                TBPR Current LTBS Pointer <= TBR Length Next TBS
IDMAC Release External Bus
IDMAC DMA Process Clean Up
    DMA Process Flags <= 'finished' flag et al
    IDMAC Causes CPU Interrupt
CPU Reads DMA Process Flags For Completion Status
DMA PROCESS COMPLETE
```

Table 3 illustrates three basic processes: the IDMAC preparing itself for the DMA transactions of the DMA process, the DMA transactions themselves, and the intermediate IDMAC preparation steps required to support the DMA process. It is assumed that the computing system has initialized the appropriate offset registers in the PBLR and TBPR.

The DMA process begins with the computing system writing the pointer to the first PB into the PB Pointer Register of the PBLR. Next, the computing system writes to the DMA process Register's DMA Process Flags to communicate the "start" to the IDMAC. The IDMAC then takes over the rest of the DMA process, with little or no interaction by the computing system, until the DMA process is completed.

The IDMAC must prepare for the DMA process by obtaining many parameters from the PB and TBS. The IDMAC does this in a series of bus cycles. In Table 3, the "( )" represents memory indirection, "{ }" denotes comments, "++" and "--" indicate post incrementing and post-decrementing, respectively, and "<=" denotes the concept of "obtains the value of". Thus, "my_reg<=(my_addr++)" indicates that the register "my_reg" will now contain the contents of data at address "my_addr" and that "my_addr" will be incremented by the correct amount. The first 12 bus cycles in Table 3 dereference the pointers to the TBS. Specifically, bus cycles 1–3 are used to obtain the Current STBS Pointer, cycles 4–6 are used to obtain the Current DTBS Pointer, cycles 7–9 are used to obtain the Current OTBS Pointer, and cycles 10–12 are used to obtain the Current LTBS Pointer.

Bus cycle 1–3 exemplifies the operation of each of these four sets. First, the IDMAC, having obtained access to the computing system bus required for DMA operation, outputs the address of the PB Pointer plus the PB STBS Offset. For example, if the PB Pointer is set at 0x12345668, and the PB STSB Offset is set at 0x10, the address broadcast is 0x12345678 (i.e. the contents of the two registers have been added internally, and then output on the address bus). The data contents of that address are then stored in the Source Indirect Transaction Block Register 1 (SITBR1). In the second bus cycle, the value stored in SITBR1 is placed on the address bus, and the data at that location is stored in the Source Indirect Transaction Block Register 2 (STBBR2). In the third bus cycle, the value stored in SITBR2 is placed on the address bus, and the data at that location is stored into the Current STBS Pointer. In summary, this procedure includes three bus cycles: obtaining the pointer to the first indirect pointer and dereferencing two indirect pointers to obtain the actual pointer to the first Source Transaction Block Structure. Cycles 4–6, 7–9, and 10–12 behave similarly for the Destination, Opcode, and Length Transaction Block Structures, respectively. Importantly, note that these examples each show two indirections, i.e. nested indirections, per type of TBS. Other embodiments of the invention may have zero, one, or more levels of indirection.

Once the actual pointers to the TBSs have been obtained, the IDMAC requires two additional cycles to obtain the pointer to the Next and Previous (in this case, none) PB. Cycle 13 illustrates the manner of obtaining the Previous PB Pointer, whereas Cycle 14 illustrates the obtaining of the Next PB Pointer. If the IDMAC has exhausted all the DMA transactions referenced by the current PB, the IDMAC must use the Next PB Pointer to begin the next set of DMA transactions in the next PB, if there is one. Note that this renewal is evaluated at the completion of all the DMA transactions for the current PB.

Bus cycles 15 through 29 represent the cycles required by the IDMAC to gather the relevant parameters to effect the DMA transaction from the TBS. Prior to this point, the IDMAC only knows where the TBSs are located in memory, and not what is contained in them. During these next cycles, the IDMAC obtains the actual parameters for the current DMA transaction, along with other relevant parameters. As before, the cycles are split into four sets of cycles: source, destination, opcode, and length. The first three sets require four bus cycles each whereas the last set only requires three.

Cycles 15–18 exemplify the functioning of the other three sets. During bus cycle 15, the IDMAC obtains the pointer to the Next Source Transaction Block Structure. In Cycle 16, the IDMAC obtains the pointer to the Previous Source Transaction Block Structure (note that in this case, there is no previous STBS and therefore a special "flag" value communicates this fact to the IDMAC). During Cycle 17, the IDMAC obtains the actual start address for the Source, and places that into the Source Address Register. Cycle 18 is used by the IDMAC to obtain the number of data entities to transfer starting from the address specified by the Source Address Register. This length value is used to allow the IDMAC to know when to get the next Source TBS.

Similarly, Cycles 19–22 are used by the IDMAC to obtain the Next Destination TBS Pointer, Previous Destination TBS Pointer, Destination Address, and Destination Length. Cycles 23–26 are used by the IDMAC to obtain the parameters for the Data Intelligence Unit (DIU). In this case, the key parameter obtained is the opcode to tell the DIU how to process the data. Additionally, the IDMAC also obtains a length value so it can understand when to obtain the next opcode. Cycles 27–29 are used by the IDMAC to obtain the next, previous, and length values of the LTBS for the DMA transaction. Although only one LTBS would typically be present in a system, Table 3 illustrates the ability to support multiple length LTBSs, as may be needed by some systems.

The first DMA bus cycle of the current DMA transaction begins at Cycle 30. In this example, only non-fly-by transfers are illustrated. That is, there is a first bus cycle for gathering the DMA data from the source address, and a second bus cycle for storing the DMA data at the destination address. In other embodiments of the present invention, these cycles are combined into a single cycle for fly-by transfers. During the first DMA bus cycle, the Source Address Register contents are placed on the address bus, and the contents of that address are stored internally in the IDMAC. It is important to note that the first bus cycle could also be a burst of many data entities stored in an internal FIFO to the IDMAC and using multiple bus cyles. This method is often used to reduce bus turnaround time in modern computing systems as known by those skilled in the art, and therefore is not discussed in detail.

At the completion of the source address bus cycle, the Source Address Register will be altered according to the DMA flags of the transaction or the IDMAC implementation. That is, it could be left alone, post-incremented, or post-decremented. The examples herein illustrate post-incrementing. Additionally, the Source Length Count Register is decremented so that the IDMAC knows exactly how many data entities are left before it must process the next Source Transaction Block Structure. Note that the data from the DMA bus cycle may be stored in the DIU. At this point, the DIU can operate upon the data as specified by the Opcode Register in the TBR. If the data is bursted, the data can be operated on as each entity is being placed in IDMAC storage. Alternatively, if the DMA transactions are set up as fly-by, the data can be altered on the fly and not stored in the IDMAC.

The second DMA bus cycle of the IDMAC involves placing the contents of the Destination Address Register on the address bus and the contents of the IDMAC DIU register(s) on the data bus. The Destination Address Register is left alone, post-incremented, or post-decremented as required. Table 3 illustrates the post-incremented case. The Destination Length Count as well as the Opcode Length Count and the Length Count are decremented so that the IDMAC knows the actual DMA bus cycle(s) have completed a transfer of n data entities (although only one is shown in Table 3, more data entities could be transferred if burst DMA bus cycles are used). Note that the if data is bursted by either the source or destination, the lengths of appropriate parameters must be correctly altered (e.g., a burst of 4 must result in length minus 4).

This dual set of DMA bus cycles continues until one of the four Length registers reaches zero. Table 3 illustrates that the DMA bus cycles continue until bus cycle n+1, where the Source Length Count has reached zero. At this point, the IDMAC completes the first DMA transaction and gathers more parameters via bus cycles n+2 through n+5. These four cycles are identical in function to cycles 15–18. Specifically, these cycles are used to obtain the next Source Transaction Block Structure's data for the next DMA transaction. Thus, whenever one of the four Length registers of the TBR reaches zero, the IDMAC must obtain the next set of TBS parameters in order to continue the DMA process to completion. Note that whenever any of those Length registers expires, a new DMA transaction is said to begin. Table 3 shows the second DMA transaction terminating with bus cycle m+1. At this point, the Destination Length has expired. Therefore, bus cycles m+2 through m+5 represent the bus cycles required by the IDMAC to obtain the parameters from the next Destination Block Transaction Structure.

Following this sequence, the DMA process continues, obtaining the new source address, destination address, opcode, or length parameters as required by the TBSs. Eventually, the last DMA bus cycle of the last DMA transaction (#Z, bus cycle k+3, in Table 3) has taken place. The IDMAC knows this because all four length count values have exhausted themselves during the same bus cycle and the Next PB Pointer contains a "stop" token. That is, the Source Length Count, Destination Length Count, Opcode Length Count, and Length Count are all zero, and the Next PB Pointer contains a null, wherein null is the stop token. If the Next Pointer Register contains a valid address instead of the stop token, the process will repeat from bus cycle 1, until the last DMA bus cycle of the last DMA transaction of the last Parameter Block has been exhausted. If all the TB Length registers are exhausted, the IDMAC must evaluate the next PB, if there is one, to begin the next DMA transaction. The gathering of the next PB's parameters and subsequent DMA transactions continues until the entire DMA process has completed. The example in Table 3 only illustrates one PB, for the sake of brevity.

Note that to control the addresses between source and destination, the post-increment, post-decrement, or no-change, can be designed into the IDMAC for static control, or added as additional parameters in the TBS or PB along with appropriate registers and control logic in the IDMAC to accommodate this function. Thus, some embodiments of the IDMAC may have the IDMAC always increment the source and destination address, whereas other embodiments may read parameters from the TBS or PB to determine the appropriate control.

Figure 8:
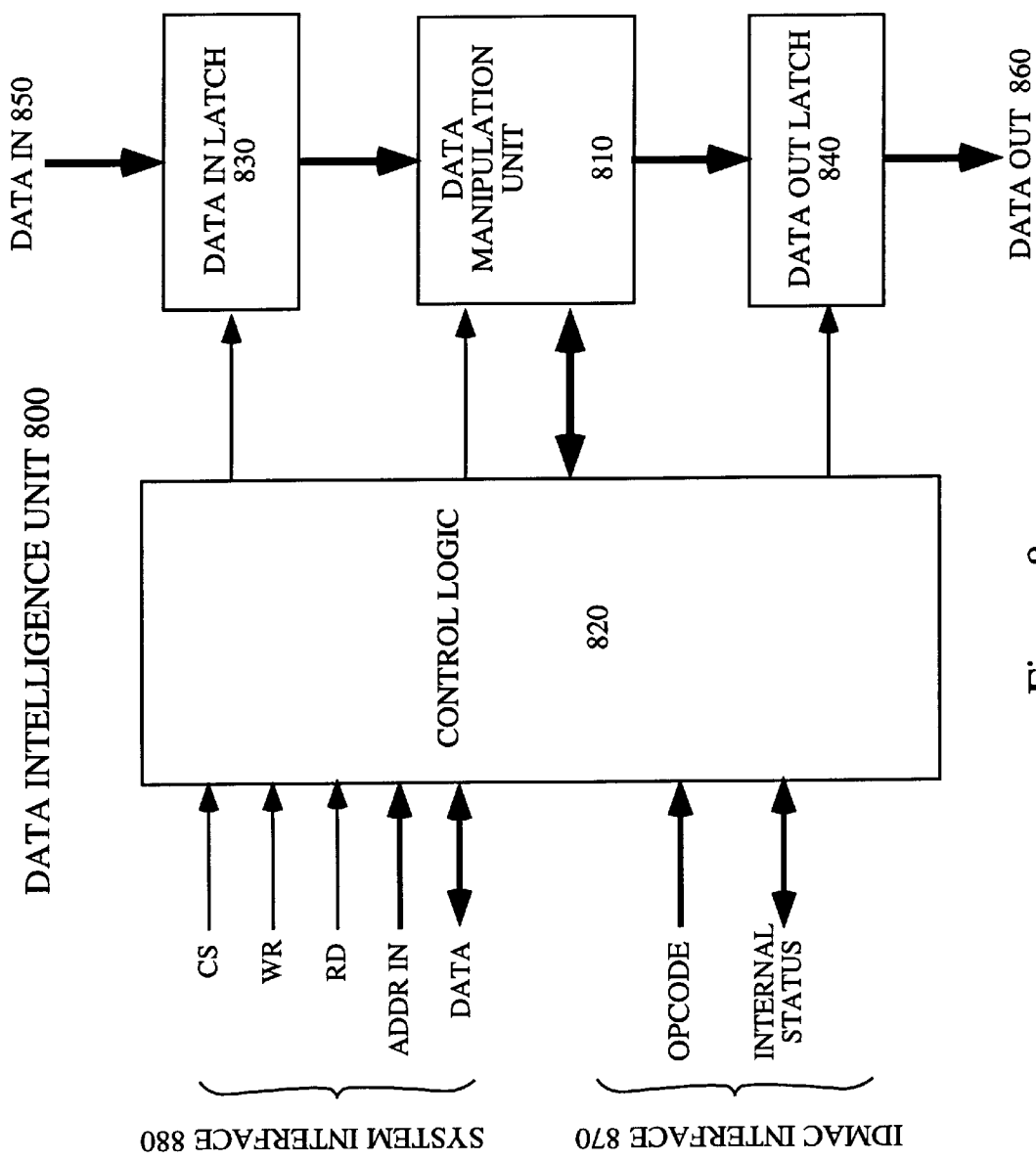
FIG. 8 is a block diagram that illustrates the Data Intelligence Unit in the IDMAC of the present invention.

FIG. 8 illustrates one implementation of a Data Intelligence Unit (DIU) 800 which is responsible for interpreting the opcodes stored in the Opcode Register of the TBR. DIU 800 consists of at least two pieces of hardware: a Data Manipulation Unit 810 and Control Logic 820. Control Logic 820 can be implemented as part of the IDMAC's control logic, or as a separate entity of its own. Optional pieces of hardware include a Data In Latch 830 and a Data Out Latch 840. An IDMAC Interface 870 facilitates communication between DIU 800 and the rest of the IDMAC, whereas a System Interface 880 facilitates communication between DIU 800 and the computing system.

Data Manipulation Unit 810 is the core of the data processing mechanism of DIU 800. When the IDMAC has received a valid Opcode, the Opcode is handed to Data Manipulation Unit 810 via IDMAC Interface 870 and Control Logic 820. Data Manipulation Unit 810 alters the data according to its internally decoded definition of what the opcode is supposed to do. Examples of data manipulation operations specified by an Opcode include the logic functions of AND, OR, XOR, and NOT. Additionally, the Opcode could specify certain arithmetic functions like increment, decrement, add, subtract, multiply, and divide. Importantly, the opcode may have an "operand" specified with the opcode. For the sake of simplicity, this pairing is collectively referred to as an "opcode". The operand can be used as a constant value, or for whatever means are required to effect the data manipulation. Note that Data Manipulation Unit 810 could operate on multiple opcodes at a time if sufficient hardware resources are made available. Support for multiple opcodes may also necessitate adding additional set of registers to the IDMAC. Note also that the DIU can dynamically obtain an operand per DMA data fetch/store, assuming an adequate set of registers and control logic were built into the IDMAC and that the computing system created the data structure for the operand.

Control Logic 820 may be considered part of the overall control logic required to implement the IDMAC. Control Logic 820 provides appropriate state sequencing, control signals, and interface to other logic in the IDMAC or in the computing system. In the case of bursty types of DMA bus cycles or if the IDMAC needs to intermediately store the data, Control Logic 820 also controls Data In Latch 830 and Data Out Latch 840. Data In Latch 830 is used to either logically or physically store the contents of the incoming data. When the IDMAC operates in a fly-by mode, Data In Latch 830 behaves like a transparent latch in transparent mode. If the IDMAC is operating in the two bus cycle per transfer mode, Data In Latch 830 behaves as a latch or register to hold the contents of the data. If the IDMAC is operating in a bursty transfer mode, Data In Latch 830 is implemented as a FIFO or RAM to temporarily store the data. Importantly, depending upon Control Logic 820 and the implementation of Data In Latch 830 and Data Out Latch 840, Data Manipulation Unit 810 may manipulate the data as it is incoming, as it is outgoing, or as it is being transferred between Data In Latch 830 and Data Out Latch 840.

The Data Out Latch 840 behaves similarly to the Data In Latch 830. If the IDMAC is doing fly-by DMA transfers, Data Out Latch 840 remains transparent, unless some intermediate form of storage is required to support the fly-by bus cycle. In this case, the data is still flowing through the IDMAC, and thus special care must be taken in the design of the data path portion between the source and destination to ensure that fly-by operations can take place. If the IDMAC is transferring data in two DMA bus cycles, then Data Out Latch 840 is used to store the manipulated data until the destination bus cycle occurs. If the IDMAC is bursting data between the source and destination in a non-fly-by manner, Data Out Latch 840 represents a storage element to hold the processed data of Data Manipulation Unit 810 until the burst destination bus cycles.

Data In 850 and Data Out 860 are ports that are used to communicate data between the source and destination. Data In 850 corresponds to the port for the Source data, whereas Data Out 860 corresponds to the port for the Destination data. Note that if no data manipulation operations are used in the computing system, the entire DIU 800 may be removed and replaced with a simple data latch or memory. Moreover, if the computing system limits its DMA process to only fly-by types of DMA bus cycles, then even this simple data latch or memory can be removed. In yet other embodiments, Data In 850 and Data Out 860 are the same.

Figure 9:
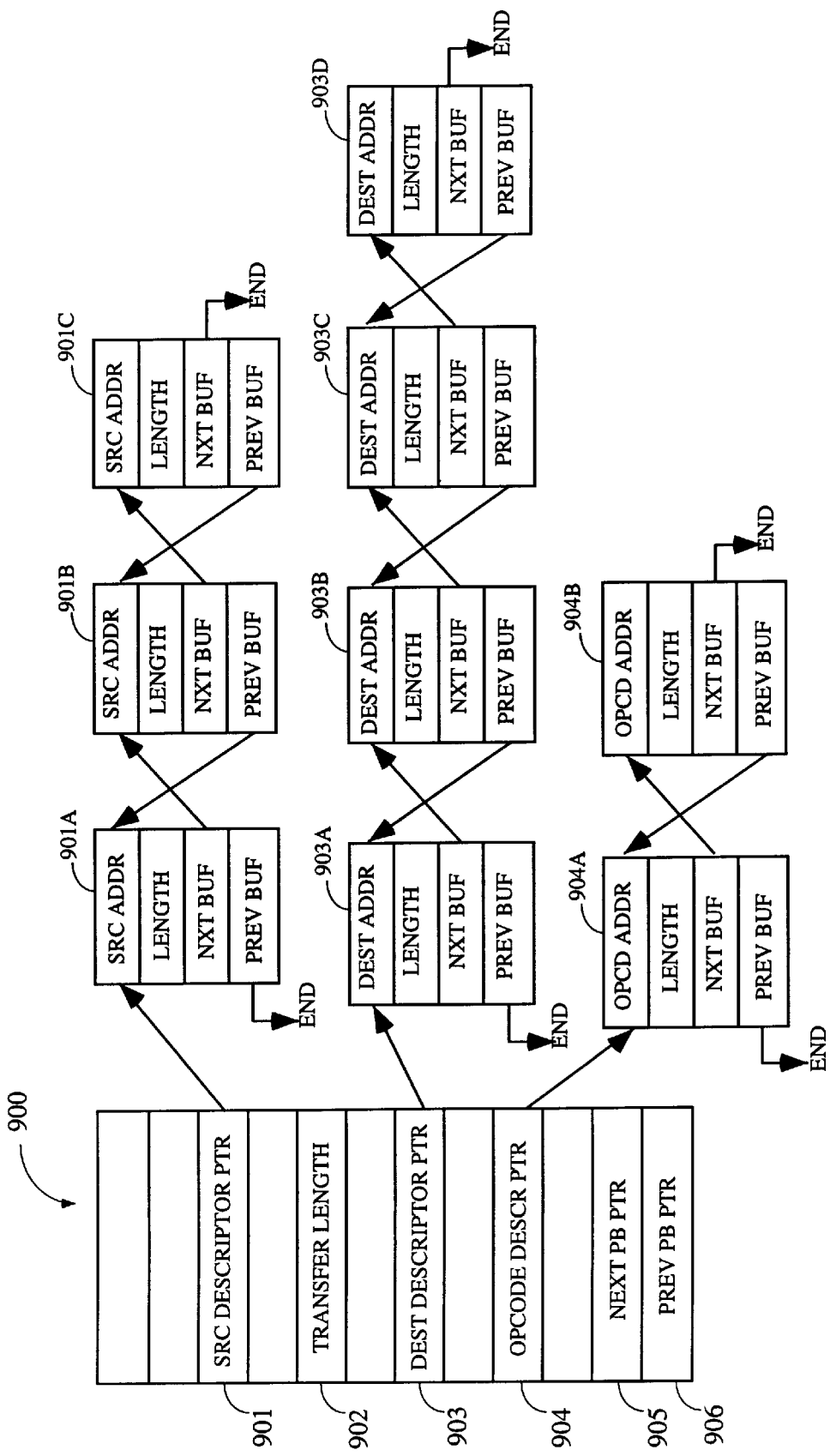
FIG. 9 illustrates a more detailed block diagram of the IDMAC of the present invention.

FIG. 9 is a block diagram that illustrates the IDMAC of the present invention. The IDMAC uses various buses and/or signals, including Address In, Data In, Address Out, Bus Control, and Data Out, to communicate in the computing system environment. Data In and Data Out represent the data bus of the computing system, whereas Address In and Address Out represent the address bus. Bus Control represents the signals required by the computing system to sense accesses to the IDMAC by the CPU, as well as provide a means for the IDMAC to obtain the computing system bus for DMA and control data transfers.

Address Multiplexer 910 multiplexes the various output signals from the register sets (920–970) to drive the Address Out bus during an IDMAC bus cycle. Address Multiplexer 910 may also contain logic for summing together the data in registers to correctly generate an address. For example, Table 3 shows in bus cycle 1 that the PB Pointer register is summed with the PB STBS Offset register. The resulting value is then placed on the Address Out bus to correctly select the value in memory that corresponds to the appropriate data. Thus, Address Multiplexer 910 handles the multiplexing of the contents of the register sets, and operates upon those contents as determined by Control Logic 980 (explained in detail below).

FIG. 9 illustrates the registers from Table 1 in larger context. For example, DMA Parameter Registers (DPR) 920 represent all the registers illustrated in Table 1 under the DMA Parameter Registers heading. The remaining registers are: Parameter Block Registers (PBR) 930, Parameter Block Location Registers (PBLR) 940, Indirect Transaction Block Registers (ITBR) 950, Transaction Block Pointer Registers (TBPR) 960, and Transaction Block Registers (TBR) 970. These registers taken together represent the bulk of the controlwise intelligence required to build the IDMAC for the example shown in FIGS. 7 and 8.

In this embodiment, Control Logic 980 contains a state machine which controls the sequence of operations required to effect the DMA process. For example, the DMA process must gather the parameters from the PB(s) and TBS(s) in memory, begin actual DMA bus cycles, gather more parameters from memory as required, and then complete all DMA transactions of the DMA process. This sequencing of outputing addresses, obtaining data, and gaining access to the computing system buses is handled by Control Logic 980. Other embodiments may use comparable means to effect the sequencing of operations required to effect the DMA process.

Additionally, Control Logic 980 may need to obtain data from registers 920–970. Accordingly, Control Logic 980 includes internal buses that communicate that data based upon the need of Control Logic 980. These sequences and buses are designed into the IDMAC during the design phase of the IDMAC. Some parameters may be left variable and therefore may be modified by the computing system itself once the IDMAC is instanciated in such system. Importantly, Control Logic 980 is also responsible for handling the Bus Control interface to the computing system. This set-up allows the computing system to communicate status and parameter updates to the IDMAC, while also providing the IDMAC with a means of gaining control over the computing system bus to effect DMA or parameter bus cycles.

Data Intelligence Unit (DIU) 990 is included for the sake of completeness of the IDMAC. That is, DIU 990 is not required to provide the controlwise intelligence of the IDMAC. However, it is required to effect the datawise intelligence. As previously described in reference to FIG. 8, DIU 990 includes Data In Latch 830, Data Manipulation Unit 810, Data Out Latch 840, and Control Logic 820 (see FIG. 8). DIU 990 is instanciated in the IDMAC design only if the designer intends to enable datawise intelligence operations. The actual operations that are enabled by DIU 990 is set by the designer during the design phase, or may be dynamically built if sufficient hardware resources are allocated.

Figure 10A:
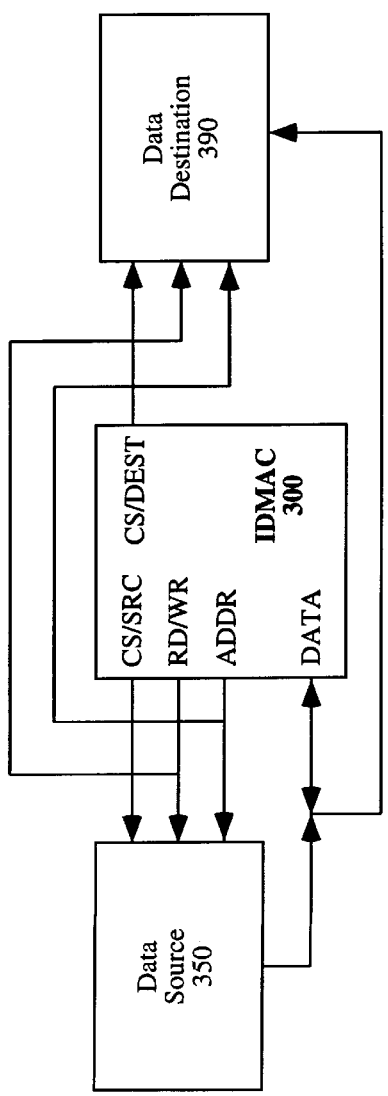
FIGS. 10A and 10B describe two separate DMA bus cycles used to transfer data between the source and destination.
Figure 10B:
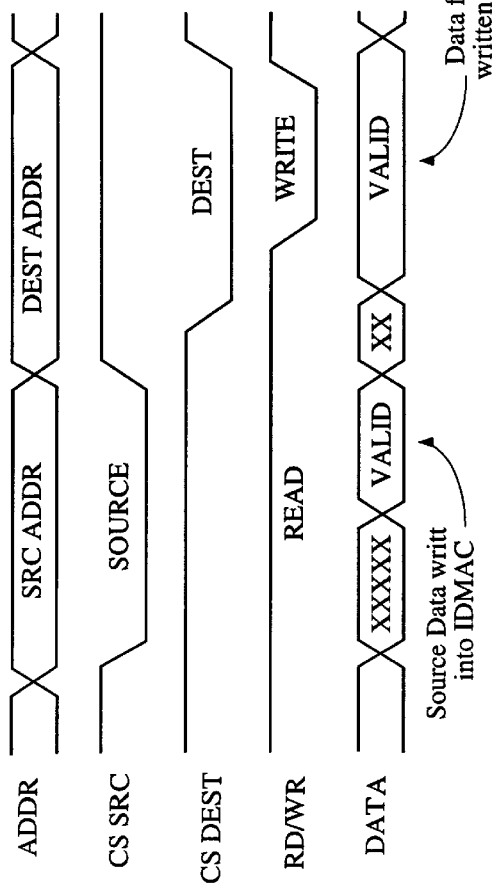

FIG. 10A shows in a block diagram how IDMAC 300 might effect DMA bus cycles to transfer data between data source 350 and data destination 390 (assuming that IDMAC 300 has already obtained all parameters from memory or registers (not shown)). FIG. 10B shows in a timing diagram two DMA bus cycles in which IDMAC 300 generates a unique address for the source as well as the destination, thereby implying two complete DMA bus cycles on the computing system bus for one transfer of data. That is, IDMAC 300 uses one computing system bus cycle to get the source data, and then another computing system complete bus cycle to store the data to the destination. Thus, in this embodiment, the source cannot directly communicate its data to the destination, even though the source and destination may reside on the same data bus.

Figure 11A:
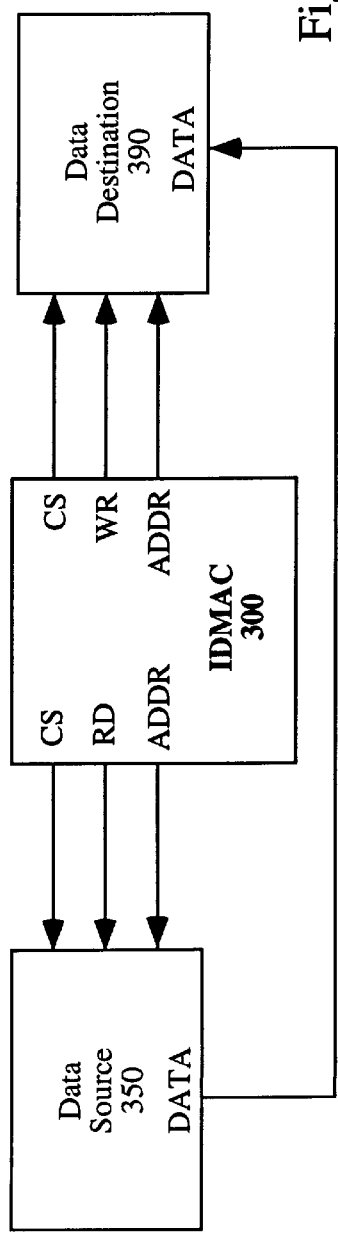
FIGS. 11A and 11B describe a fly-by DMA bus cycle of data between the source and destination.
Figure 11B:
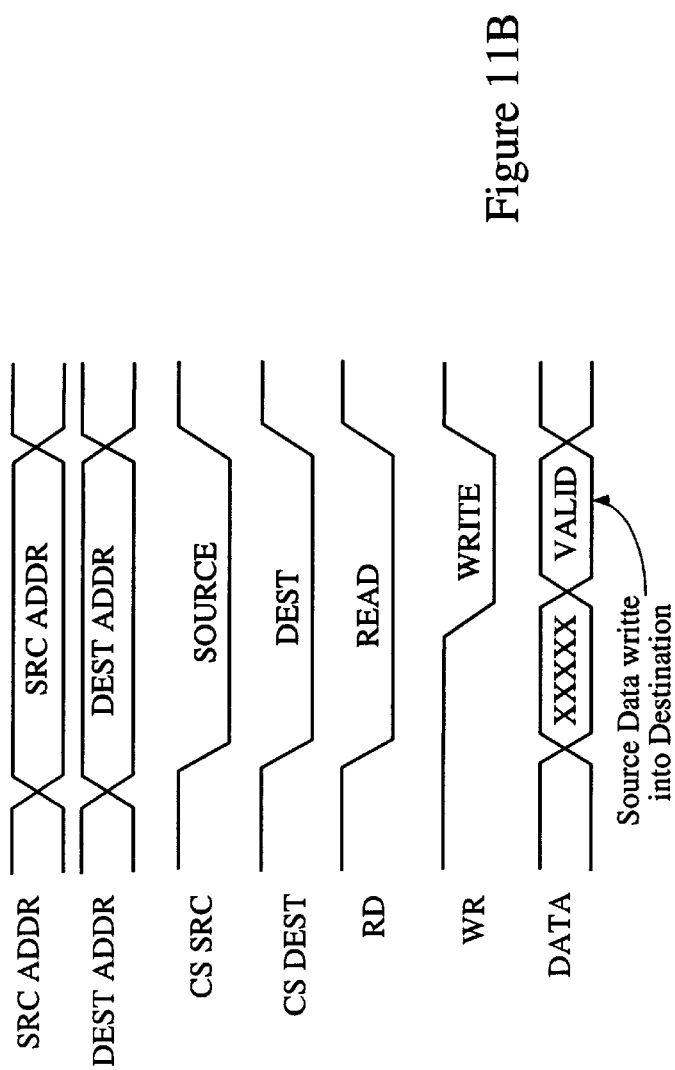

FIGS. 11A and 11B describe a fly-by DMA bus cycle of data between the source and destination, wherein FIG. 11A illustrates a block diagram and FIG. 11B illustrates a timing diagram. FIGS. 11A and 11B are similar to FIGS. 10A and 10B with three key differences. First, IDMAC 300 does not inherently need to store the data. Instead, data is communicated between source 350 and destination 390 directly. Second, the entire DMA bus cycle can be finished in a single complete bus cycle of the computing cycle (i.e. 1:1 correspondence between the DMA bus cycle vs. the computing system bus cycle). Third, the Chip Select (CS) for the source and destination are simultaneously active while the Read (RD) and Write (WR) are split for simultaneous access. Importantly, the IDMAC must either be able to produce dual addresses simultaneously, or must be able to otherwise control the function of the source and destination such that the two may use the common data bus between them to accomplish the data transfer. This method of operation is advantageous because it allows the DMA bus cycles to run twice as fast as the method illustrated in FIGS. 10A and 10B.

Overview and Further Details Regarding the IDMAC

As described in detail above, the Intelligent Direct Memory Access Controller (IDMAC) of the present invention has two different forms of intelligence. The first form of intelligence is controlwise intelligence which refers to the method and apparatus required to effect Direct Memory Access (DMA) transfers of data between a source and a destination. The second form of intelligence is datawise intelligence which refers to the method and apparatus required to effect manipulations on the data that is undergoing DMA transfers.

The IDMAC raises the software interface to a higher level in the software hierarchy than that illustrated by FIG. 2. This is effected by using specific knowledge of the software interface known as an Application Programming Interface (API). The API contains parametric data in Parameter Blocks (PBs) and Transaction Block Structures (TBSs) that are required by a DMA controller to effect DMA transfers. For example, PBs may include Source Address information, Destination Address information, and Length Count information. The present invention is superior because it can directly interpret the memory structures of higher level software that store parametric data, without intervention by the CPU of the computing system. This controlwise intelligence offers significant performance advantages over prior art methods because it frees the CPU to process other types of information instead of DMA setup, driver software, and OS software, thereby making the overall system more responsive and faster.

The IDMAC also offers an additional ability not found in prior art devices: the ability to encode opcodes in parametric structures (PBs and/or TBSs) in memory which can be directly interpreted by the IDMAC and used to manipulate the actual content of the data between the source and destination of the DMA transfer. This ability can be very useful in 3D graphics applications, where large quantities of data might be "block moved". The ability to control the content of the data, as well as the location of the data, makes the IDMAC a very powerful tool for coprocessing data, beyond the abilities to perform DMA transfers.

The IDMAC utilizes the concept of a DMA process. The DMA process is the entirety of a set of DMA transactions to move data from a source to a destination. This DMA process can be quite complex, or quite simple. In the simplest case, like that illustrated in FIG. 4, the IDMAC simply reads a Parameter Block from memory where the DMA process parameters are stored. These parameters are then directly used to effect the DMA transactions. In the example of FIG. 4, a single DMA process includes a single DMA transaction which in turn comprises a fixed number of DMA transfers of DMA bus cycles.

The DMA bus cycles, shown in FIGS. 10B and 11B, illustrate two examples of data transfer between the source and destination. Importantly, the DMA bus cycles are distinct from the CPU bus cycles that normally dominate the computing system bus. Additionally, the IDMAC may perform its own bus cycles to obtain the required parametric data for the IDMACs internal registers.

A complex IDMAC is explained in detail in reference to FIGS. 7–9 and Tables 1–3. In a complex IDMAC, the DMA process is likely to be substantially more complicated than the process of FIG. 4. Whereas the simple example (FIG. 4) typically has a single DMA transaction per DMA process, the complex IDMAC (FIGS. 7–9) has many DMA transactions per DMA process. For example in FIG. 7, the IDMAC not only recognizes the multiple PBs of FIG. 6, but also recognizes that each of the DMA parameters (Source, Destination, and Length as a minimum, with Opcode optional) has its own unique data structure. These unique data structures, called Transaction Block Structures (TBSs), are used to implement linked lists of parameters. The TBSs permit the IDMAC to support scatter-gather types of operation on each parameter. Importantly, for each of the TBSs, a DMA transaction is implicitly defined.

In a complex IDMAC, the DMA transactions include sets of DMA cycles that continue until all the data for any TBS is completed, and therefore requires the next TBS to be read once the previous one has been exhausted. Thus, if three Source TBSs exist, and two destination and one length and opcode TBS exist, then four separate DMA transactions will be required in order to effect the DMA process. Note that the DMA process may be accommodated by linking together multiple PBs, wherein multiple transactions are controlled by multiple TBSs.

One major advantage of the IDMAC is its scalability. The principal behind the IDMAC's controlwise intelligence is that it is capable of directly reading and dereferencing memory, as required. For example, for each additional level of indirection, from 0 levels to N levels, the IDMAC simply adds additional registers to hold the contents, and additional control logic to cause the indirections to be dereferenced.

Importantly, the datawise intelligence is also scalable. That is, only the data manipulations required are implemented. If additional data manipulations are required, they are simply added to the DIU. However, the DIU is optional, and therefore can be removed when not needed.

The inner workings of the DMA process are illustrated in Table 3. This table shows the bus cycles required to implement an illustrative complex IDMAC. The first 29 bus cycles are IDMAC bus cycles to obtain and dereference parametric data. Following those bus cycles are the DMA bus cycles required to transfer the DMA data from the source to the destination, i.e. the first DMA transaction. Following the end of the DMA transaction, the IDMAC obtains the next set of required parameters: in this case, the next TBS for the source. This procedure then starts transferring DMA data again until the end of the next TBS is reached, whereupon the next parameters are read in again and the whole procedure repeated. At the end of the DMA process, the Source length, Destination Length, and Length Count should all be exhausted, and the Next PB Pointer should indicate the end of the DMA process.

There are several important aspects of the IDMAC which will become apparent to one skilled in the art once the IDMAC structure is understood. First, the IDMAC supports the ability to be channelized. That is, separate DMA processes can be initiated by the computing system. This ability is important because Real Time Operating Systems (RTOSs) require the ability to begin a DMA process for one Operating System process concurrently with any other outstanding DMA process. To effect channelization, simply instantiate as many copies of the register sets as are required to implement one complete set of registers per channel. In this way, the DMA processes can be almost totally independent of one another. Unless the computing system offers separate buses for each of these logical channels of DMA process, the IDMAC also needs an arbiter to decide between the two (or more) DMA processes which are pending.

The IDMAC can also effect its channelization in another manner. Specifically, the IDMAC control logic contains state machine(s) to effect the procedures of getting data from memory, dereferencing it as appropriate and storing into the registers required for the DMA transfer. By using additional states in the IDMAC control logic, the IDMAC easily stores and reads the entire contents of its registers into memory, thereby permitting a channelized version of the IDMAC to do complete context switches in a small number of bus cycles. That is, the complete contents of the IDMAC registers for a channel can be dumped into a predetermined memory array, and restored from a different memory array for another channel. The implementation of such a system requires only minor changes in the control logic, and an additional Context Pointer Register for each channel. Therefore, this small addition of logic to the IDMAC is potentially a very useful savings of internal IDMAC hardware at a small expense in DMA bandwidth.

Another important aspect of the IDMAC is that it could also be tuned to understand "object-oriented" structures. These structures are simply different forms of PBs which contain more content-based information. In this embodiment, the control logic and register set are altered to effect the new understanding of the object-oriented structure. In practice, these structures are merely more complicated versions of the same data of PB and TBS.

The IDMAC can also be instructed dynamically or statically to increment/decrement/remain unchanged for the DMA source and/or destination addresses. This means that a DMA from a port to an array in memory can be done, or any other combination. To accomplish this, registers are provided in the TBR that hold flags for the DMA transaction. The values for these flags are derived from the TBS, stored in the TBR, and used by the control logic to cause the Source Address Register and Destination Address Register to count according to the flag value.

This feature enables, for example, block moves of memory where the destination would normally overwrite source data that has not yet been moved. To accomplish this block move, the IDMAC's state machine is altered in the control logic to handle "out-of-order" processing of the DMA data by controlling the sequencing of the addresses. Additionally, memory banks can be address wise inverted by controlling the flag count type of the source and destination. Still further, each of these kinds of operations can be merged with the datawise intelligence of the DIU to effect desired pattern movements and data manipulation. This flexibility enables the IDMAC, for example, to move graphical areas on a computer screen with almost no CPU intervention: for example, moving a window against a background.

The IDMAC intelligence can be altered dynamically, should the need arise. This dynamic altering can be accomplished by building the IDMAC such that registers which are under CPU control will be used by the IDMAC control logic to know which set of registers are required for the DMA process (which is needed particularly when the DMA channel is dynamically used by a RTOS). Thus, to build in this kind of mechanism to the IDMAC, the designer implements the largest set of possible registers required for the most complex operations the system needs to complete. Next, the control logic is extended so that bits in a new register alter the states that are completed to get the parametric data. The simplest way of building such logic is to treat each bit in the register as an independent enable of a particular function.

For example, Table 1 illustrates two separate copies of indirection registers, and each of these register sets per the four parameter types (source, destination, opcode, and length). The enablement of each function to obtain and dereference information could be mapped by a set of eight bits, two bits per parameter type, wherein each bit independently enables the indirection function of one indirection register. Thus, the IDMAC could be enabled in eight bits, one indirection for each parameter at a time, to dynamically perform the indirection function on the appropriate type. For example, perhaps the Source has two levels of indirection, the destination has only one level of indirection, and the length and opcode do not use indirection at all. Dynamically, when the DMA channel is called upon to read that kind of PB/TBS structure, the CPU during the initialization process would write the bit pattern to the control logic register that correspond to two levels of source, one level of destination, and no levels of length or opcode indirection. The control logic would then read the contents of this register dynamically during the DMA process to correctly obtain the parameters from the structured memory. The IDMAC would thus dereference the address of the Source TBS twice, the Destination TBS once, and use the values in the PB for the pointers to the Opcode TBS and Length TBS directly. It should be noted that the dynamically changeable IDMAC must operate under strict rules. In the above example where the opcode pointer is read directly, the control logic has to know that it is reading the actual pointer, and not an indirect version thereof.

Most functions of the IDMAC can be made to be dynamically changeable, using the method and apparatus described above. The simple example of FIG. 4 can be implemented with the complex example of FIG. 7 simply by altering the contents of the registers in the control logic which enable the various types of memory dereferencing. For example, in the simple IDMAC process, the PB holds the actual data of the DMA transaction, i.e. Source Address, Destination Address, Length, and Opcode. To enable this form of behavior of the IDMAC, the IDMAC control logic registers would be disabled. That is, no other functions would be derived for this DMA process. In contrast, in the complex IDMAC process, all functions would be enabled, and thus the 29 IDMAC bus cycles illustrated in Table 3 would be enabled to eventually obtain the same parameters.

The examples used throughout this Specification illustrate the IDMAC instantiated into a computing system. Although this use is the most likely, the IDMAC of the present invention may also be instantiated as the central controller of a stand-alone system.

The IDMAC described herein uses a minimum of three parameters to control the data transfers, namely source address, destination address, and length count. However, one skilled in the art can recognize that additional parameters, even unrelated to the DMA transfer, can also be obtained and managed by the IDMAC. For example, the addition of the optional datawise intelligence and its corresponding opcode parameter illustrates the principal of adding parameters.

The IDMAC should not be seen as being limited to a single bus structure. Modern computing systems allow for bus structures that split read and write transactions, addresses, etc. The IDMAC need merely be designed to take advantage of such a bus structure. Further, because the IDMAC is scalable, its control logic could be altered to effect bus bridging between two different bus structures in the context of a DMA process. This means that the IDMAC can easily support posted, split, multi-threaded bus structures, by simply adding the appropriate control logic and registers.

The IDMAC of the present invention provides the following advantages over the prior art:

(1) enabling of controlwise intelligence, (2) enabling of datawise intelligence, (3) effecting either of these intelligence statically during the design phase of the IDMAC, or dynamically during the usage of the instantiated IDMAC, (4) enabling dynamic control of the two intelligences through hardware built into the IDMAC, (5) converting the IDMAC to one of several forms of channelized DMA, including a form that permits complete context switch of the DMA process even if it is ongoing, and (6) reducing the overall impact of data movement to the system by eliminating wasteful CPU bus cycles and replacing those cycles with substantially more efficient IDMAC and DMA bus cycles.

What is claimed is:

1. A method of effecting a direct memory access in a computer system comprising an intelligent direct memory access controller (IDMAC), a memory, a destination, and a source, the method including:

providing the IDMAC with specific knowledge of a structure of parameter blocks (PBs) in the memory, the structure including at least one pointer for indicating an initial memory location and a plurality of parameter locations, each parameter location based on the initial memory location;

directly reading the structure of the PBs from the memory; and getting a plurality of parameters directly from the memory.

2. The method of claim 1 further including transferring data between the source and the destination, as instructed by the PBs.

3. The method of claim 1 wherein the plurality of parameters include at least one of a source address, a destination address, a transfer length, and an opcode.

4. The method of claim 1 wherein the specific knowledge is provided during the design phase of the IDMAC.

5. The method of claim 1 wherein the specific knowledge is dynamically provided during the operation of the IDMAC.

6. The method of claim 1 wherein the PBs provide more than one level of indirection.

7. A method of effecting a direct memory access in a computer system comprising an intelligent direct memory access controller (IDMAC), a memory, a destination, and a source, the method including:

providing the IDMAC with specific knowledge of a structure of a parameter block (PB) in the memory, the structure including at least one pointer for indicating an initial memory location and a plurality of parameter locations, each parameter location indicating an offset from the initial memory location;

directly reading the structure of the PB from the memory; and getting a plurality of parameters directly from the memory.

8. The method of claim 7 further including transferring data between the source and the destination, as instructed by the PB.

9. The method of claim 7 wherein the plurality of parameters include at least one of a source address, a destination address, a transfer length, and an opcode.

10. The method of claim 7 wherein the specific knowledge is provided during the design phase of the IDMAC.

11. The method of claim 7 wherein the specific knowledge is dynamically provided during the operation of the IDMAC.

12. A method of effecting a direct memory access (DMA) transaction in a computer system comprising an intelligent direct memory access controller (IDMAC), a memory, a destination, and a source, the method including:

providing the IDMAC with specific knowledge of a structure of at least one parameter block (PB) in the memory, the structure including a plurality of pointers, each pointer indicating a plurality of transaction block structures, each transaction block structure indicating an address, a length, a next transaction block structure, and a previous transaction block structure;

directly reading the structure of the PB from the memory; and getting a plurality of parameters directly from the memory.

13. The method of claim 12 wherein the structure further includes a next PB pointer and a previous PB pointer.

14. The method of claim 13 further including providing full error recovery.

15. The method of claim 12 further including providing backup DMA transactions.

16. The method of claim 12 further including reading an indirect transaction block structure before finding at least one transaction block structure.

* * * * *